United States Patent
Kobori et al.

(10) Patent No.: US 10,345,983 B2
(45) Date of Patent: Jul. 9, 2019

(54) DETECTION APPARATUS, INPUTTING APPARATUS, AND DETECTION METHOD IN WHICH SWITCH CIRCUIT IS CONTROLLED TO CAUSE FIRST AND SECOND SIGNALS TO BE SUPPLIED TO FIRST AND SECOND SENSOR ELECTRODES, RESPECTIVELY

(71) Applicant: Wacom Co., Ltd., Saitama (JP)

(72) Inventors: Takeshi Kobori, Tokyo (JP); Yoshihisa Sugiyama, Saitama (JP)

(73) Assignee: WACOM CO., LTD., Saitama (JP)

( * ) Notice: Subject to any disclaimer, the term of this patent is extended or adjusted under 35 U.S.C. 154(b) by 52 days.

(21) Appl. No.: 15/456,021

(22) Filed: Mar. 10, 2017

(65) Prior Publication Data

US 2017/0177123 A1    Jun. 22, 2017

Related U.S. Application Data

(63) Continuation of application No. PCT/JP2015/065381, filed on May 28, 2015.

(30) Foreign Application Priority Data

Oct. 6, 2014    (JP) ................................ 2014-205340

(51) Int. Cl.
   *G06F 3/046* (2006.01)
   *G06F 3/041* (2006.01)
   *G06F 3/0354* (2013.01)

(52) U.S. Cl.
   CPC .......... *G06F 3/046* (2013.01); *G06F 3/03545* (2013.01); *G06F 3/0416* (2013.01)

(58) Field of Classification Search
   CPC ..... G06F 3/046; G06F 3/0416; G06F 3/03545
   See application file for complete search history.

(56) References Cited

U.S. PATENT DOCUMENTS 5,120,907 A  *  6/1992  Shinbori ................ G06F 3/046
                                                178/18.07
5,276,282 A  *  1/1994  Russell .................. G06F 3/046
                                                178/18.02
(Continued)

FOREIGN PATENT DOCUMENTS

EP        0 525 413 A2    2/1993
JP         7-44304 A       2/1995
(Continued)

OTHER PUBLICATIONS

Extended European Search Report, dated May 22, 2018, for European Application No. 15849235.5-1221, 11 pages.

*Primary Examiner* — Kwang-Su Yang
(74) *Attorney, Agent, or Firm* — Seed IP Law Group LLP

(57) ABSTRACT

An inputting apparatus of the electromagnetic induction type may provide a transmission signal of a sufficient signal level to a position indicator. A process controlling unit controls a selection circuit on the basis of a reception state of a reception signal received by each of a plurality of electrodes and detected by a reception signal processing circuit such that a first signal for transmitting a transmission signal is supplied to a first electrode at which the reception signal indicates the highest signal level. Further, the process controlling unit controls the selection circuit such that a second signal is supplied to a second electrode at which the signal level of the reception signal is lower than a predetermined signal level. Consequently, signals can be transmitted to a position indicator from both the first electrode, which most receives the signal from the position indicator, and the second electrode spaced from the first electrode.

9 Claims, 12 Drawing Sheets

(56) References Cited

U.S. PATENT DOCUMENTS

| | | | | |
|---|---|---|---|---|
| 5,567,920 A | * | 10/1996 | Watanabe | G06F 3/046 |
| | | | | 178/18.07 |
| 5,691,513 A | | 11/1997 | Yamamoto et al. | |
| 2012/0162127 A1 | * | 6/2012 | Onoda | G06F 3/0416 |
| | | | | 345/174 |

FOREIGN PATENT DOCUMENTS

| | | |
|---|---|---|
| JP | 8-286814 A | 11/1996 |
| JP | 2000-231443 A | 8/2000 |

\* cited by examiner

FIG.2
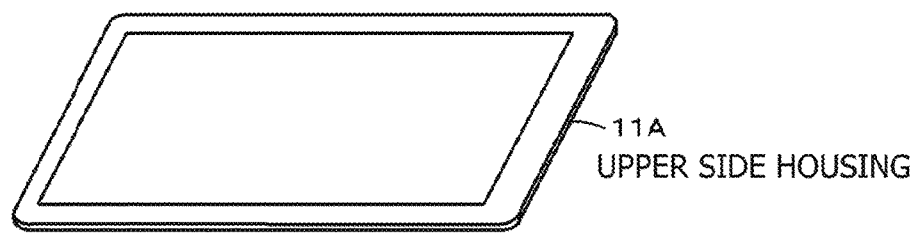
10 ELECTRONIC APPARATUS
11A UPPER SIDE HOUSING
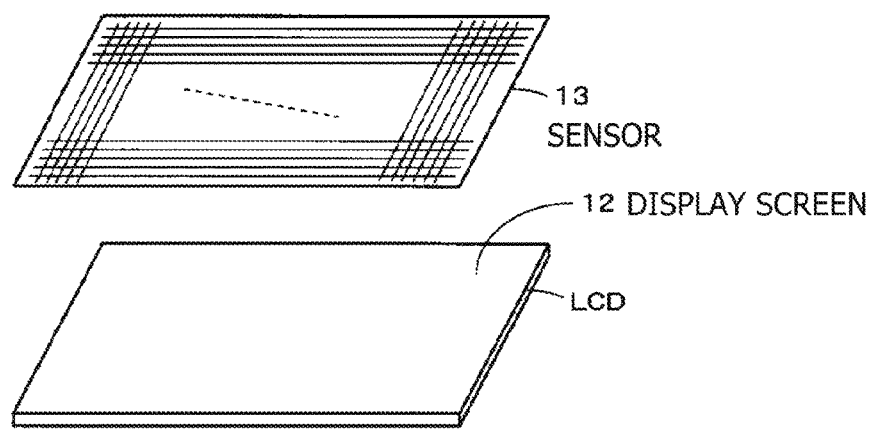
13 SENSOR
12 DISPLAY SCREEN
LCD
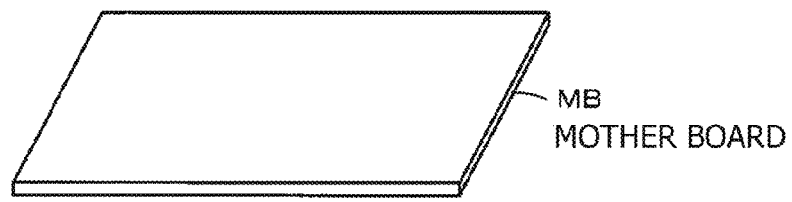
MB MOTHER BOARD
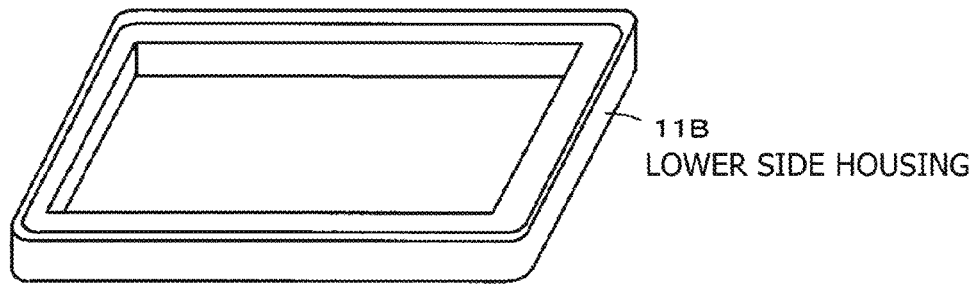
11B LOWER SIDE HOUSING

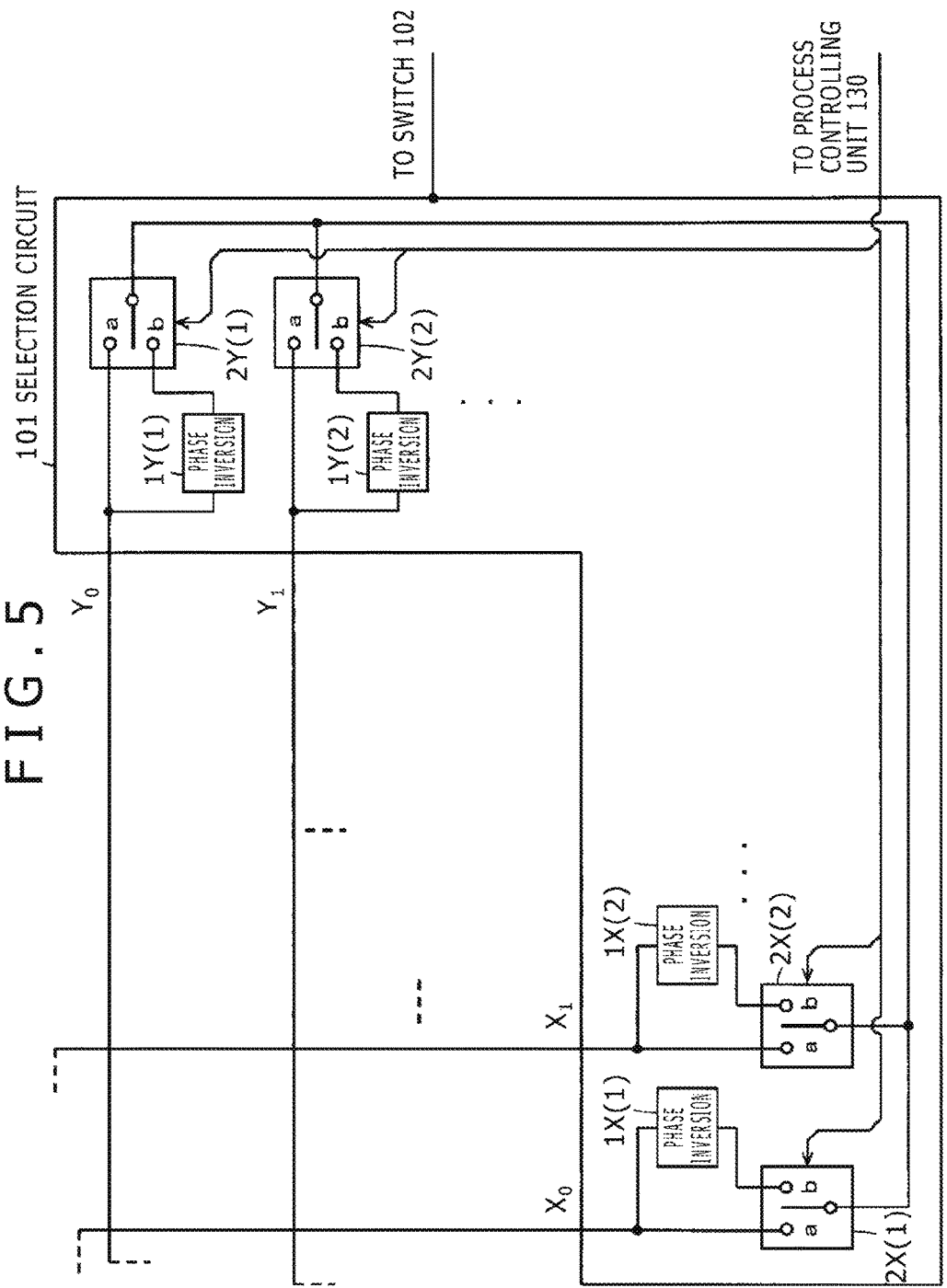

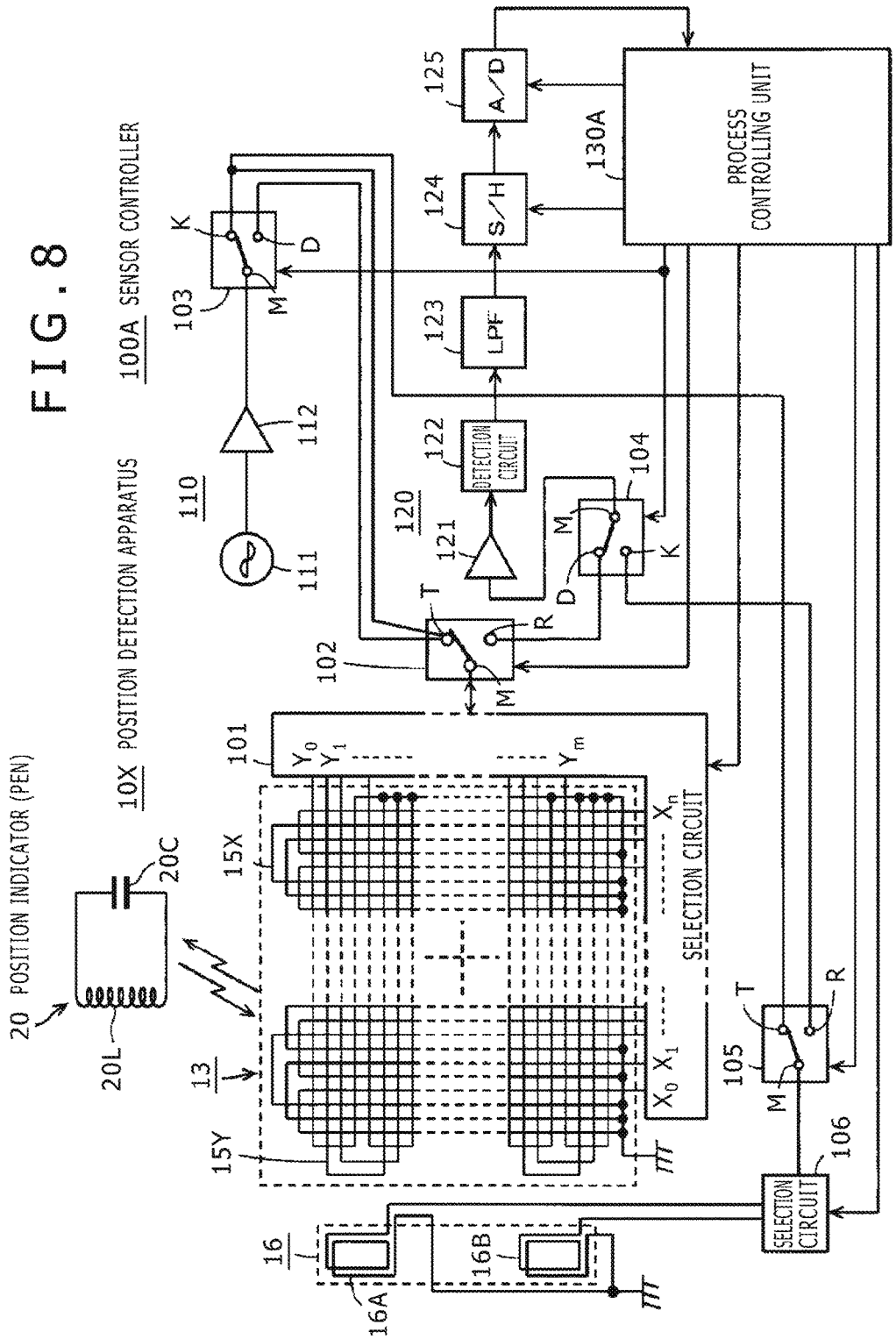

DETECTION APPARATUS, INPUTTING APPARATUS, AND DETECTION METHOD IN WHICH SWITCH CIRCUIT IS CONTROLLED TO CAUSE FIRST AND SECOND SIGNALS TO BE SUPPLIED TO FIRST AND SECOND SENSOR ELECTRODES, RESPECTIVELY

TECHNICAL FIELD

The present disclosure is directed to a detection apparatus of the electromagnetic induction type, an inputting apparatus formed of the detection apparatus and an indicator, and a detection method for use with the detection apparatus.

DESCRIPTION OF THE RELATED ART

An inputting apparatus of the electromagnetic induction type is used as an inputting device for an electronic apparatus such as a tablet type terminal or a high function mobile phone terminal called a smartphone or the like. Such inputting apparatus may include a position indicator formed in a pen shape, and a position detection apparatus having an inputting face on which the position indicator is used to perform a pointing operation or inputting of characters, figures and so forth. The position indicator includes a resonance circuit formed of a coil and a capacitor. The position detection apparatus includes a sensor in which a loop coil group including a plurality of loop coils disposed in a transverse direction (X-axis direction) and another loop coil group including a plurality of loop coils disposed in a longitudinal direction (Y-axis direction) are stacked.

In such types of position detection apparatus, detection of a position indicated is performed by operations as briefly described below. First, in the position detection apparatus, one loop coil at a time is selected in a predetermined order from among the plurality of loop coils disposed on the sensor, and a transmission signal is transmitted from the selected loop coil to the position indicator. Consequently, the capacitor of the position indicator is charged. Then, the loop coil used for the transmission is connected to a reception circuit to receive a signal transmitted from a resonance circuit of the position indicator, and detection of the indicated position is performed based on the received signal. By performing such transmission and reception of a signal while successively switching the loop coils, the position indicated by the position indicator on the sensor is detected.

In Patent Document 1, Japanese Patent Laid-Open No. Hei 07-044304, an inputting apparatus of the electromagnetic induction type is disclosed. For an inputting apparatus of the electromagnetic induction type, various improvements have been made, and an operation method (scanning method) for coils forming a sensor is disclosed, for example, in Patent Document 2, Japanese Patent Laid-Open No. Hei 08-286814 or Patent Document 3, Japanese Patent Laid-Open No. 2000-231443.

BRIEF SUMMARY

Technical Problems

In a conventional inputting apparatus of the electromagnetic induction type, one loop coil at a time in a loop coil group, for example, in the X-axis direction positioned just below a position indicator is used to transmit a transmission signal from a position detection apparatus to the position indicator. If a transmission signal is transmitted from a loop coil just below the position indicator, then the signal level of a signal received by the position indicator is high and a capacitor of a resonance circuit can be charged efficiently.

However, if transmission of a transmission signal of a high signal level is attempted using one loop coil, then it is necessary to drive the transmission circuit with a high voltage or high current or to continue transmission of a transmission signal for a long period of time, which may increase the scale of the transmission circuit or increase current consumption. Further, even where one loop coil just below the position indicator is used to transmit a transmission signal to the position indicator, if the size of the loop coil is small, it may fail to transmit a transmission signal of sufficiently high signal level to the position indicator.

It may be possible to use two loop coils respectively belonging to a loop coil group for an X-axis direction and a loop coil group for a Y-axis direction and positioned just below a position indicator, to transmit transmission signals of the same phase at the same time to the position indicator. However, in the proximity of a bezel (frame) made of a metal, for example, of a front panel of the position detection apparatus, the metallic bezel sometimes shields part of a transmission signal transmitted from a loop coil in the proximity of the bezel. In this case, although two loop coils just below the position indicator are used, a transmission signal having a sufficient signal level cannot be provided to the position indicator.

In recent years, as an inputting apparatus of the electromagnetic induction type, an inputting apparatus is provided which includes, in addition to a main sensor, a sub sensor having a small region to implement a function, for example, a button function for switching a mode. Since the sub sensor has a small area, a large loop coil cannot be disposed in the sub sensor, and also it is difficult to dispose a plurality of loop coils in the sub sensor. Therefore, where the sub sensor having the small region is indicated (e.g., pointed to) by the position indicator, a transmission signal of a sufficient signal level may not be able to be transmitted to the position indicator from a loop coil just below the position indicator, or a long period of time may be required to supply a sufficient transmission signal.

Taking the foregoing into consideration, it is desired to provide a signal of an appropriate signal level to a position indicator even where, in an inputting apparatus of the electromagnetic induction type, a metal member which shields a transmission signal exists in the proximity of a loop coil or even where the loop coil is small.

Technical Solution

In embodiments in accordance with the present disclosure, an indicator detection apparatus transmits a signal to an indicator having a resonance circuit to cause the resonance circuit to resonate, and receives a signal transmitted from the resonance circuit of the position indicator to detect the indicator. The detection apparatus includes: a sensor including a plurality of electrodes, which, in operation, transmit the signal to the indicator and receive the signal transmitted from the resonance circuit of the indicator; a signal supplying circuit, which, in operation, supplies a first signal to the sensor causing each of the plurality of electrodes to generate a magnetic field to transmit the signal to the indicator, causing the resonance circuit of the indicator to resonate; and a detection circuit, which, in operation, detects the signal transmitted from the resonance circuit of the indicator and received by the plurality of electrodes of the sensor. When the first signal is supplied to a first electrode at which the signal transmitted from the resonance circuit of the indicator indicates a highest signal level out of the plurality of electrodes of the sensor which receive the signal transmitted from the resonance circuit of the indicator, the signal supplying circuit supplies, to a second electrode at which the received signal transmitted from the resonance circuit of the indicator has a lowest signal level, a signal which causes a magnetic field generated by the second electrode to be directed so as to strengthen a magnetic field generated by the first electrode.

With detection apparatuses in accordance with embodiments described in the present disclosure, the sensor includes the plurality of electrodes, and the signal supplying circuit supplies the first signal to the sensor such that a magnetic field is generated from the electrodes of the sensor to transmit a signal to the indicator. Consequently, the resonance circuit of the indicator can be caused to resonate, and a signal is transmitted from the resonance circuit of the indicator to the sensor of the detection apparatus. The detection circuit detects the signal transmitted from the resonance circuit of the indicator and received by the plurality of electrodes, which form the sensor of the detection circuit.

The signal supplying circuit functions according to a detection output from the detection circuit. When the first signal is supplied to a first electrode at which the received signal indicates the highest signal level out of the plurality of electrodes of the sensor which receive the signal transmitted from the resonance circuit of the indicator, the signal supplying circuit supplies a determined signal to the second electrode. In this case, the second electrode is an electrode at which the received signal has the lowest signal level from among the electrodes of the sensor which receive the signal transmitted from the resonance circuit of the indicator. In described embodiments, the signal supplied to the second electrode is formed such that a magnetic field generated by the second electrode is directed so as to strengthen a magnetic field generated by the first electrode.

In accordance with embodiments of the present disclosure, a signal according to the first signal can be transmitted to the indicator from the first electrode, which receives the signal from the indicator most strongly, and further, a signal according to the second signal can be transmitted from the second electrode to the indicator. Since signals can be transmitted to the indicator from both the first electrode and the second electrode in this manner, a signal of an appropriate signal level can be provided to the indicator.

Advantageous Effect

According to embodiments of the present disclosure, a signal of an appropriate signal level can be provided to the indicator even where, in the inputting apparatus of the electromagnetic induction type, a metal member which shields a transmission signal exists in the proximity of a loop coil or even where the loop coil is small.

BRIEF DESCRIPTION OF THE SEVERAL VIEWS OF THE DRAWINGS

FIG. 2 is an exploded perspective view depicting an example of a configuration of the electronic apparatus 10.

FIG. 5 is a block diagram depicting an example of a configuration of a selection circuit 101 of the position detection apparatus 10N.

FIGS. 7A and 4B depict an appearance and an example of a configuration of a sensor of an electronic apparatus 10A of a second embodiment.

FIG. 8 is a block diagram depicting an example of a configuration of a position detection apparatus 10X.

DETAILED DESCRIPTION

In the following description, various embodiments of apparatuses and methods are described with reference to the drawings. In the embodiments described below, a position indicator 20 supports an indicator in the claims, and each of position detection apparatus 10N and 10X supports a detection apparatus in the claims.

First Embodiment FIGS. 1 to 6

[Configuration of Electronic Apparatus 10]

A configuration of an electronic apparatus 10 of a first embodiment is described with reference to FIGS. 1 and 2.

Figure 1A:
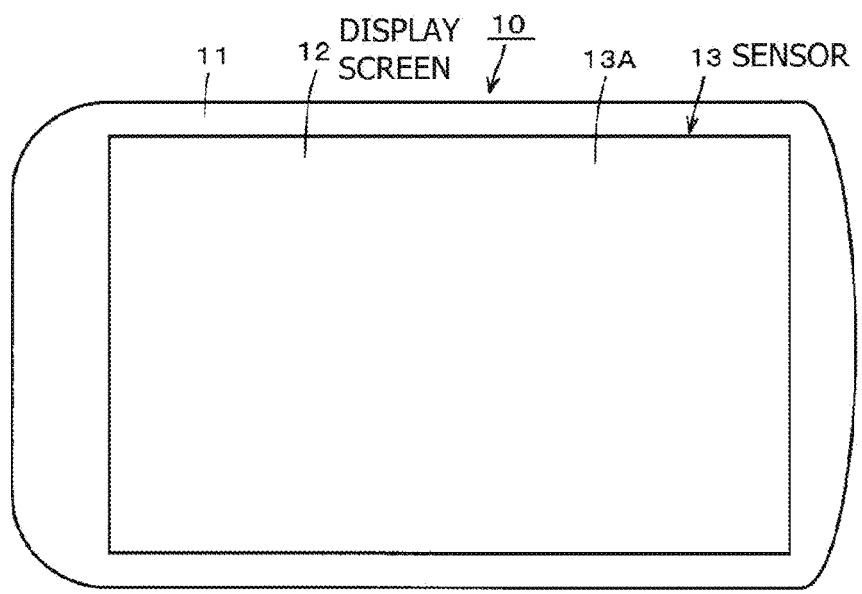
FIGS. 1A and 1B depict an appearance and an example of a configuration of a sensor of an electronic apparatus 10 of a first embodiment.

The electronic apparatus 10 of the present embodiment is a high function mobile phone terminal called a smartphone. As depicted in FIG. 1A, the electronic apparatus 10 includes a display screen 12 of a display device formed of, for example, a liquid crystal display (LCD) unit, which is provided on one face side of a housing 11 of a thin and flat substantially parallelepiped shape so as to be viewable. On the display screen 12, a sensor 13 having translucency is disposed in an overlapping relationship. A display image displayed on the display screen 12 can be viewed through an indication inputting face 13A of the sensor 13.

As depicted in FIG. 2, the electronic apparatus 10 is configured of a lower side housing 11B, a mother board MB, an LCD unit having the display screen 12, the sensor 13, and an upper side housing 11A. In the inside of the lower side housing 11B, the mother board MB, the LCD having the display screen 12 and the sensor 13 are disposed in an overlapping relationship with each other in this order from the lower side housing 11B side, and the lower side housing 11B is sealed by the upper side housing 11A. On the mother board MB, various circuits necessary for operating the electronic apparatus 10 are incorporated, such as a sensor controller hereinafter described for controlling the sensor 13 and an LCD controller for controlling the LCD unit.

Figure 1B:
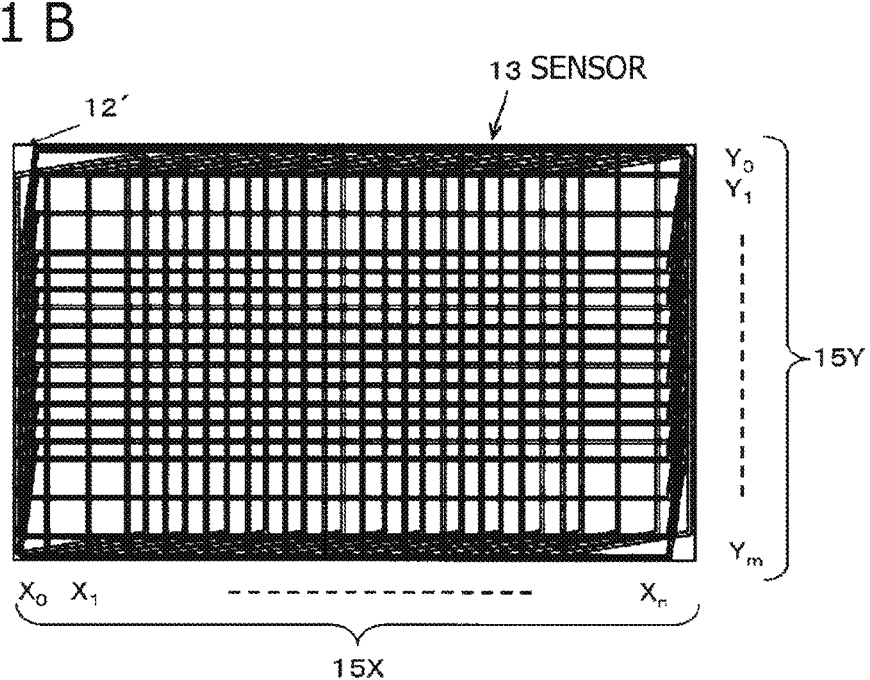

The sensor 13 is, in the present example, a sensor of the electromagnetic type and has the indication inputting face 13A formed so as to cover the display region of the display screen 12, which is defined by a solid line 12' in FIG. 1B.

The indication inputting face 13A is a detection region for detecting a position indicator and is formed of a loop coil group 15X arrayed in a first direction (longitudinal direction of the housing 11; X-axis direction) and a loop coil group 15Y arrayed in a second direction (Y-axis direction) orthogonal to the first direction.

The loop coil group 15X is formed, in the present example, of n (n is an integer equal to or greater than 2, for example, 40) loop coils $X_0, X_1, \ldots, X_n$, arrayed in the X-axis direction. Meanwhile, the loop coil group 15Y is formed, in the present example, of m (m is an integer equal to or greater than 2, for example, 20) loop coils $Y_0, Y_1, \ldots, Y_m$ arrayed in the Y-axis direction.

The plurality of loop coils $X_0$ to $X_n$ and $Y_0$ to $Y_m$ are transparent conductors made of, for example, indium tin oxide (ITO) and are formed on a transparent substrate. In the described embodiments, the loop coil group 15X and the loop coil group 15Y are formed separately on the front and rear faces of the transparent substrate, respectively.

The loop coils $X_0$ to $X_n$ of the loop coil group 15X are disposed next to each other at equal intervals in a successively overlapping relationship with each other in the X-axis direction of the indication inputting face 13A. Meanwhile, the loop coils $Y_0$ to $Y_m$ of the loop coil group 15Y are disposed next to each other at equal intervals in a successively overlapping relationship with each other in the Y-axis direction of the indication inputting face 13A.

[Configuration of Position Detection Apparatus 10N Incorporated in Electronic Apparatus 10]

An exemplary embodiment of a configuration of the position detection apparatus 10N incorporated in the electronic apparatus 10 is described with reference to FIG. 3. The position detection apparatus 10N is formed of the sensor 13 and a sensor controller 100, and an inputting apparatus (inputting device) for the electronic apparatus 10 is formed of the position detection apparatus 10N and the position indicator 20. The sensor 13 is connected to the sensor controller 100 provided on the mother board MB via a connector (not shown).

Figure 3:
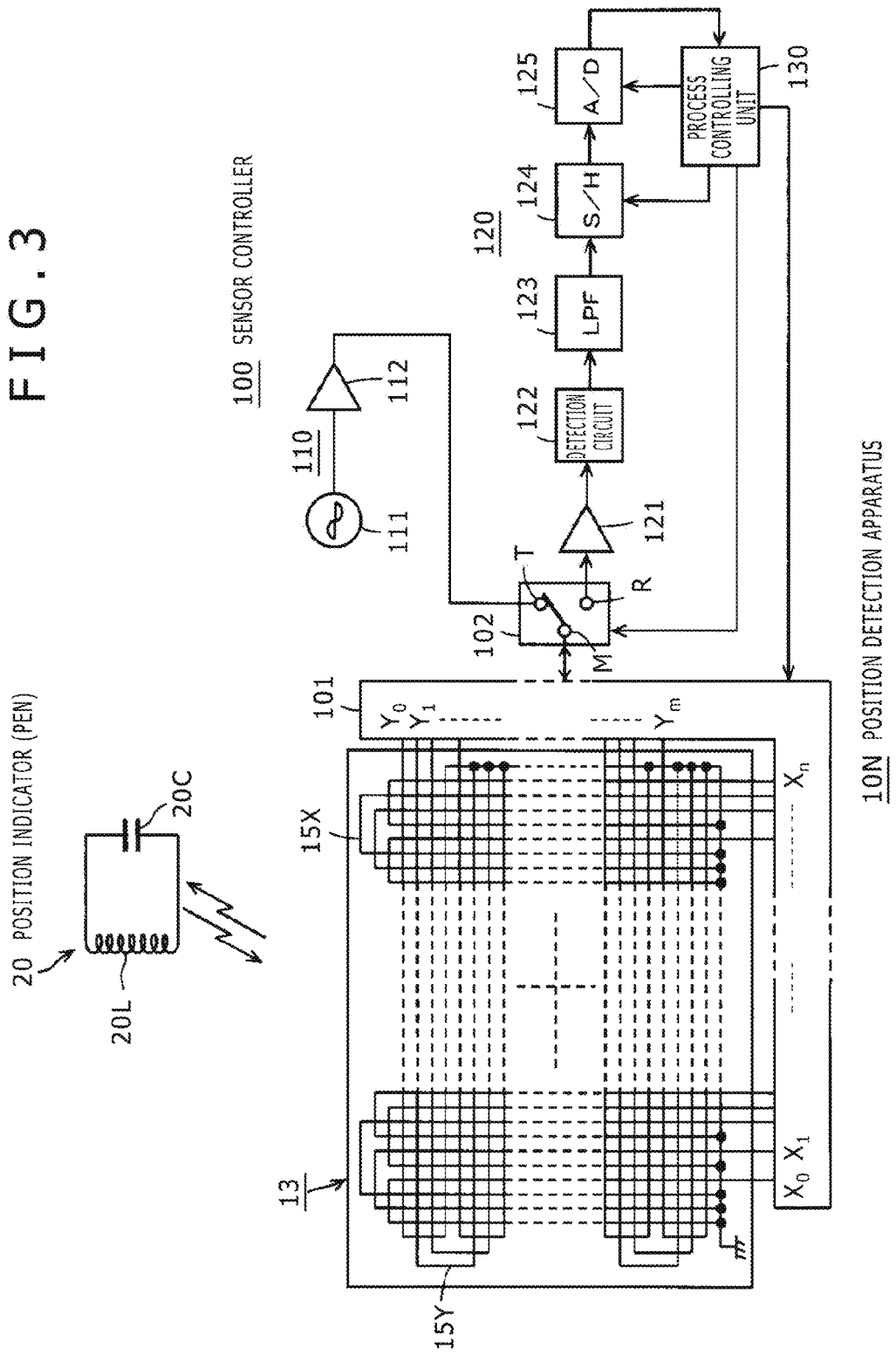
FIG. 3 is a block diagram depicting an example of a configuration of a position detection apparatus 10N.

In FIG. 3, a circuit configuration of the position indicator 20 of the pen type used to provide input to the sensor 13 of the electromagnetic induction type is depicted. The position indicator 20 includes a resonance circuit formed of a coil 20L and a capacitor 20C connected in parallel to the coil 20L.

The sensor controller 100 connected to the sensor 13 serves as a control circuit for the position detection apparatus 10N. The sensor controller 100 includes a selection circuit 101, a transmission-reception switching circuit 102, a transmission signal generation circuit 110, a reception signal processing circuit 120, and a process controlling unit 130. The transmission signal generation circuit 110 includes an oscillator 111 and a current driver 112. Meanwhile, the reception signal processing circuit 120 includes a reception amplifier 121, a detection circuit 122, a low pass filter (LPF) 123, a sampling hold circuit (denoted as S/H in FIG. 3) 124, and an analog/digital (A/D) conversion circuit 125. The process controlling unit 130 is formed of a microprocessor.

The selection circuit 101 is connected to the loop coil group 15X and the loop coil group 15Y of the sensor 13. The selection circuit 101 successively selects a loop coil from among the loop coil group 15X or 15Y of the sensor 13 for transmitting and receiving signals in accordance with a selection control signal from the process controlling unit 130. The loop coil selected by the selection circuit 101 is connected to a movable terminal M of the transmission-reception switching circuit 102.

The transmission signal generation circuit 110 is a circuit for supplying a signal to a loop coil and is formed of the oscillator 111 and the current driver 112. The oscillator 11 generates an alternating current (AC) signal of a frequency f0. The AC signal is supplied to and converted into current by the current driver 112 and then supplied to the transmission-reception switching circuit 102. The transmission-reception switching circuit 102 switches the connection destination (transmission side terminal T or reception side terminal R), to which the loop coil selected by the selection circuit 101 is connected, after every predetermined time period under the control of the process controlling unit 130. To the transmission side terminal T, the current driver 112 is connected, and to the reception side terminal R, the reception amplifier 121 is connected.

Accordingly, when the transmission-reception switching circuit 102 selects the transmission side terminal T (at a time for transmission), an AC signal from the current driver 112 is supplied to the loop coil selected by the selection circuit 101. On the other hand, when the transmission-reception switching circuit 102 selects the reception side terminal R (at a time for reception), a signal corresponding to an induced voltage generated in the loop coil selected by the selection circuit 101 is supplied to the reception signal processing circuit 120.

To the reception signal processing circuit 120, a signal according to an induced voltage generated in a loop coil selected by the selection circuit 101 is supplied. This signal is supplied through the selection circuit 101 and the reception side terminal R of the transmission-reception switching circuit 102, and is amplified by the reception amplifier 121 and then sent out to the detection circuit 122.

A signal detected by the detection circuit 122 is supplied to the A/D conversion circuit 125 through the LPF 123 and the sample and hold circuit 124. The A/D conversion circuit 125 converts an analog signal detected by the detection circuit 122 into a digital signal and supplies the digital signal to the process controlling unit 130.

The process controlling unit 130 performs control for detection of a position indicated by the position indicator 20 and performs a process for specifying a position indicated on the indication inputting face 13A by the position indicator 20. Here, the control for detection of a position indicated by the position indicator 20 includes control of selection of a loop coil by the selection circuit 101, signal switching control by the transmission-reception switching circuit 102, control of the processing timing of the sample and hold circuit 124, and so forth.

Operation of the position detection apparatus 10N incorporated in the electronic apparatus 10 is described below.

The process controlling unit 130 controls the transmission-reception switching circuit 102 to switch the selection circuit 101 to be connected to the transmission side terminal T such that an AC signal sent out from the transmission signal generation circuit 110 is supplied to a loop coil selected from among the loop coil group 15X or the loop coil group 15Y by the selection circuit 101. From the loop coil to which the AC signal from the transmission signal generation circuit 110 is supplied, a signal is transmitted by electromagnetic induction. In the present disclosure, a signal transmitted from the position detection apparatus 10N to the position indicator 20 is referred to as "transmission signal." The resonance circuit of the position indicator 20 receives the signal transmitted from the loop coil, charges the capacitor 20C, generates an induced voltage in the coil 20L, and transmits a reflection (return) signal.

The process controlling unit 130 controls the transmission-reception switching circuit 102 to switch the selection circuit 101 to be connected to the reception side terminal R. In this case, in each loop coil of the loop coil group 15X and the loop coil group 15Y, an induced voltage is generated by the reflection signal transmitted from the position indicator 20. The reflection signal transmitted from the position indicator 20 is detected by the reception signal processing circuit 120. The process controlling unit 130 calculates coordinate values in the X-axis direction and the Y-axis direction of the position indicated on the indication inputting face 13A of the sensor 13 on the basis of the level of the voltage value of the induced voltage generated in each loop coil.

In other words, the process controlling unit 130 calculates the coordinate values in the X-axis direction and the Y-axis direction of the position indicated on the indication inputting face 13A of the sensor 13 on the basis of the signal levels of reception signals received by the loop coils in terms of voltage values. Then, the process controlling unit 130 supplies information regarding the calculated coordinate values to, for example, the LCD controller on the mother board to thereby allow display control in accordance with the indicated position. In the present disclosure, a signal (reflection signal) transmitted from the position indicator 20 and received by the position detection apparatus 10N is referred to as "reception signal."

In this manner, the position detection apparatus 10N formed of the sensor 13 and the sensor controller 100 repeats transmission of a signal to the position indicator 20 and reception of a reflection signal from the position indicator 20 to specify a position indicated on the indication inputting face 13A by the position indicator 20.

[Transmission of Signal to Position Indicator 20]

Selection of a loop coil from which a signal is transmitted to the position indicator 20, as performed in the position detection apparatus 10N, and a signal transmitted from the selected loop coil are described in FIG. 4. In the position detection apparatus 10N, since a loop coil from which a signal is transmitted is selected from each of the loop coil groups 15X and 15Y using similar methods and a predetermined signal is transmitted from the selected loop coil, to simplify the description, the following describes in particular only a case in which a loop coil is selected from the loop coil group 15X and a predetermined signal is transmitted from the loop coil.

Figure 4A:
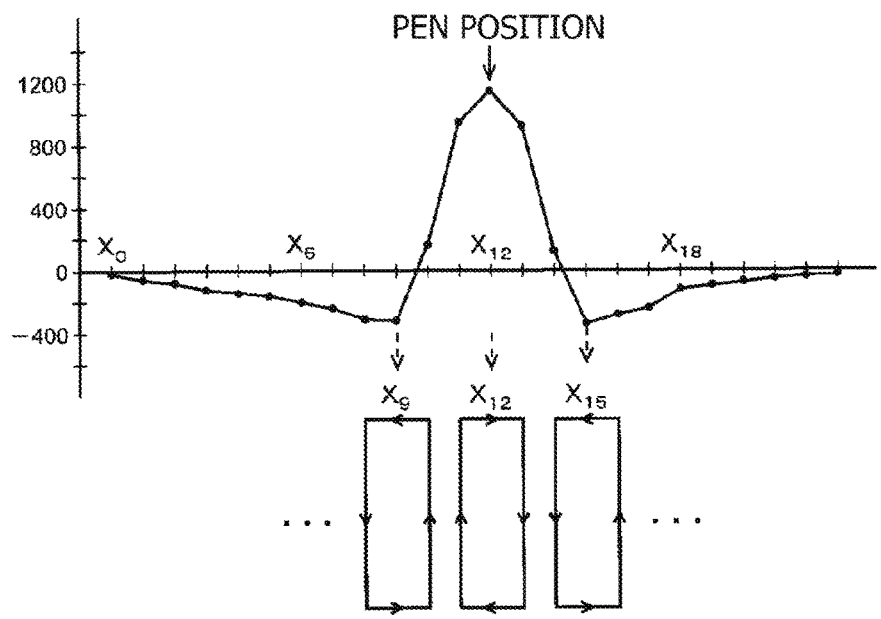
FIGS. 4A and 4B illustrate selection of a loop coil, from which a signal is transmitted to a position indicator 20, and the signal transmitted from a selected loop coil.
Figure 4B:
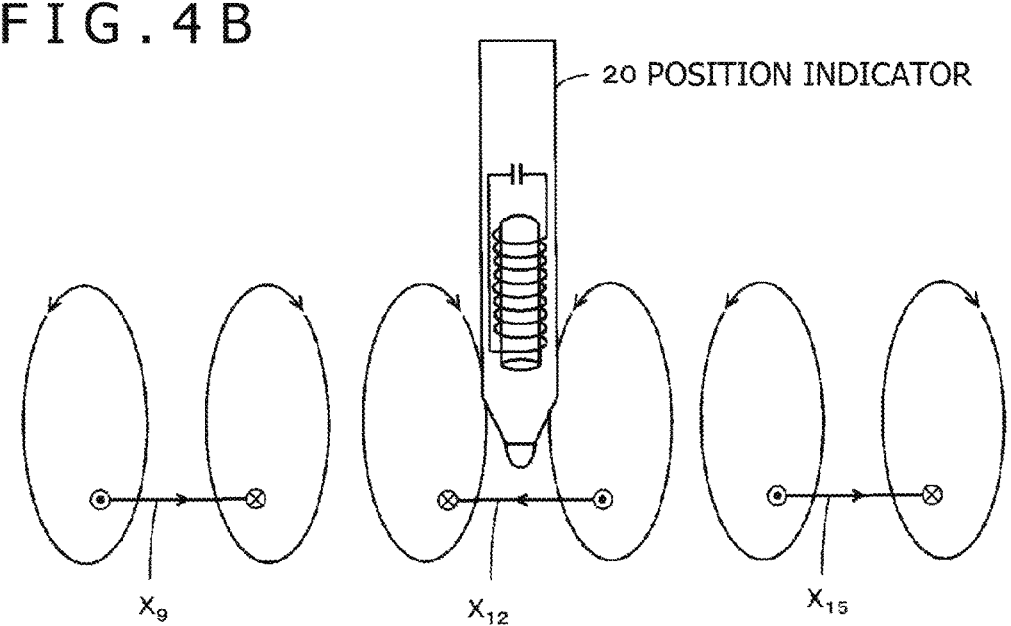

FIG. 4A is a graph indicating a result of measurement of a signal level (voltage value) of a reception signal at each of the loop coils $X_0$ to $X_n$ of the loop coil group 15X when the position indicator 20 is positioned on the 13th loop coil $X_{12}$ from the left end of the loop coil group 15X. Meanwhile, FIG. 4B illustrates a predetermined signal that is transmitted from the selected loop coil.

In the graph depicted in FIG. 4A, the axis of abscissa indicates the positions of the loop coils of the loop coil group 15X and the axis of ordinate indicates the signal level of the reception signal received by the loop coils. In the present example, the signal level of a reception signal at the loop coil $X_{12}$ just below the position indicator 20 is highest, and the signal level of the reception signal decreases as the distance from the loop coil $X_{12}$ increases.

However, in the distribution (reception signal distribution) of the signal level of the reception signal in the loop coil group 15X, the signal level of the reception signal does not decrease linearly as the distance from the loop coil $X_{12}$ just below the position indicator 20, at which the signal level of the reception signal is highest, increases. As depicted in FIG. 4A, the signal level of the reception signal first decreases to a value proximate to "−400" at the loop coils $X_9$ and $X_{15}$ which neighbor the loop coil $X_{12}$ that is just below the position indicator 20 at which the signal level of the reception signal is highest. Then, as the distance from the loop coil $X_{12}$ increases, the signal level gradually increases and finally converges to a value proximate to "0."

In particular, in the sensor 13, the signal level of the reception signal is highest at the loop coil $X_{12}$ just below the position indicator 20, and a main lobe is formed in a region including the loop coils $X_{10}$, $X_{11}$, $X_{12}$, $X_{13}$ and $X_{14}$. On both sides of the main lobe, side lobes are formed whose signal level is in the opposite direction (negative direction) as compared to that of the main lobe. One of the side lobes is formed such that a vertex in the negative direction is indicated at the loop coil $X_9$, and the other one of the side lobes is formed such that a vertex in the negative direction is indicated at the loop coil $X_{15}$.

It is theorized that factors, which cause such side lobes to be formed, include various factors such as a positional relationship of the loop coils, a direction of a magnetic field induced in each loop coil by a reflection signal from the position indicator 20, and so forth. Further, from the reception signal distribution illustrated in FIG. 4A, it may be found that the loop coil $X_{12}$ just below the position indicator 20 and the loop coils $X_9$ and $X_{15}$ interposing the loop coil $X_{12}$ at which the signal level of the reception signal is lowest are greatly influenced by the reflection signal from the position indicator 20.

Accordingly, considering the reverse, when a signal is transmitted from the loop coil $X_{12}$ just below the position indicator 20 to the position indicator 20, if a signal is transmitted also from the loop coils $X_9$ and $X_{15}$ interposing the loop coil $X_{12}$ at which the signal level of the reception signal is lowest, then an induced voltage can be efficiently generated in the coil 20L of the position indicator 20. Therefore, it may be desirable to supply the same signal to the loop coil $X_{12}$ and the loop coils $X_9$ and $X_{15}$.

However, from the positional relationship of the three loop coils $X_9$, $X_{12}$ and $X_{15}$, if the same signal is also supplied to the loop coils $X_9$ and $X_{15}$ when a signal is transmitted from the loop coil $X_{12}$, then the direction of induced magnetic fields generated in the loop coils $X_9$ and $X_{15}$ is opposite from that of the induced magnetic field generated in the loop coil $X_{12}$. Therefore, if the same signal is supplied to the loop coils $X_9$, $X_{12}$ and $X_{15}$, then the induced magnetic field generated in the loop coil $X_{12}$ and the induced magnetic fields generated in the loop coils $X_9$ and $X_{15}$ cancel each other. In this case, the signal transmitted to the position indicator 20 decreases in comparison with that in an alternative case in which a signal is transmitted to the position indicator 20 only from the loop coil $X_{12}$.

Therefore, in accordance with embodiments described herein, to the loop coil $X_{12}$ just below the position indicator 20 at which the received signal indicates the highest signal level, a signal (first signal) from the transmission signal generation circuit 110 is supplied, and to the loop coils $X_9$ and $X_{15}$ at which the reception signal indicates the lowest signal level, a signal (second signal) of the opposite phase to that of the first signal is supplied. The second signal is obtained by inverting the phase of the first signal from the transmission signal generation circuit 110. Consequently, a signal flowing to the loop coil $X_{12}$ just below the position indicator 20 and signals flowing to the loop coils $X_9$ and $X_{15}$ at which the signal level of the reception signal is lowest flow in the opposite directions from each other as depicted in the lower part of FIG. 4A.

Consequently, as depicted in FIG. 4B, the directions of magnetic fields generated in loop coils that are adjacent each other become the same, and cancellation of the induced magnetic field generated in the loop coil $X_{12}$ and the induced magnetic fields generated in the loop coils $X_9$ and $X_{15}$ can be avoided. Accordingly, in comparison with an alternative case in which a signal is transmitted only from the loop coil $X_{12}$ just below the position indicator 20 at which the signal level of the reception signal is highest, the signal transmitted to the position indicator 20 can be increased significantly.

Further, also when the position of the position indicator 20 is moved to the left or to the right with respect to the loop coil $X_{12}$ on the sensor 13, the position indicator 20 can receive signals supplied not only from the loop coil $X_{12}$ but also from the loop coil $X_9$ and/or the loop coil $X_{15}$. Accordingly, a signal transmitted to the position indicator 20 can be increased significantly.

In the position detection apparatus 10N of the present example, the selection circuit 101 includes a phase inversion circuit such that, to a loop coil corresponding to the vertex position of the main lobe in the reception signal distribution, a first signal is supplied from the transmission signal generation circuit 110, and to loop coils corresponding to the vertex positions of the side lobes, a second signal having a phase opposite from that of the first signal is supplied.

[Embodiment of Configuration and Operation of Selection Circuit 101]

An embodiment of a configuration of the selection circuit 101 of the position detection apparatus 10N of the present disclosure is described with reference to FIG. 5. As depicted in FIG. 5, each of the loop coils $X_0$ to $X_n$ of the loop coil group 15X has a phase inversion circuit 1X(1), 1X(2), . . . and a switch circuit 2X(1), 2X(2), . . . provided therein. Meanwhile, each of the loop coils $Y_0$ to $Y_{1n}$ of the loop coil group 15Y has a phase inversion circuit 1Y(1), 1Y(2), . . . and a switch circuit 2Y(1), 2Y(2), . . . provided therein.

In the following description, except for a case in which each element is indicated distinctly, each of the phase inversion circuits 1X(1), 1X(2), . . . is referred to as phase inversion circuit 1X, and each of the switch circuits 2X(1), 2X(2), . . . is referred to as switch circuit 2X. Similarly, each of the phase inversion circuits 1Y(1), 1Y(2), . . . is referred to as phase inversion circuit 1Y, and each of the switch circuits 2Y(1), 2Y(2), . . . is referred to as switch circuit 2Y. The switch circuits 2X and 2Y in the present embodiment include terminals a and b, and can be placed into a state in which the loop coil is not connected to the movable terminal M of the transmission-reception switching circuit 102, without being switched to the terminal "a" or "b" or any other terminal under the control of the process controlling unit 130.

When a signal is transmitted from the loop coil group 15X to the position indicator 20, the selection circuit 101 switches the switch circuit 2X connected to the loop coil just below the position indicator 20 to the terminal "a" side and switches the switch circuits 2X each connected to the loop coil at which the signal level of the reception signal is lowest to the terminal "b" side. Based on such switching, a first signal from the transmission signal generation circuit 110 is supplied to the loop coil just below the position indicator 20 while the first signal having been inverted in phase by the phase inversion circuit 1X is simultaneously supplied to the loop coil at which the signal level of the reception signal is lowest. Accordingly, a second signal of a phase inverted from that of the first signal is supplied to the loop coil at which the signal level of the reception signal is lowest. Consequently, as described hereinabove with reference to FIG. 4B, a signal is transmitted from each of the loop coil just below the position indicator 20 and a loop coil at which the signal level of the reception signal is lowest to the position indicator 20 such that the signals do not cancel each other.

On the other hand, when a reflection signal from the position indicator 20 is received by the loop coil group 15X, the switch circuit 2X connected to each loop coil of the loop coil group 15X is switched to the terminal "a" side. Consequently, similarly as in the conventional case, each loop coil of the loop coil group 15X is connected to the movable terminal M of the transmission-reception switching circuit 102, and detection of a position indicated by the position indicator 20 is performed.

In the description of the present embodiment, operation of the selection circuit 101 is described regarding when transmission and reception of a signal are performed through the loop coil group 15X. When transmission and reception of a signal are performed by the loop coil group 15Y, the switch circuit 2Y connected to each loop coil configuring the loop coil group 15Y operates similarly to the switch circuit 2X.

[Control Process of Process Controlling Unit 130]

Figure 6:
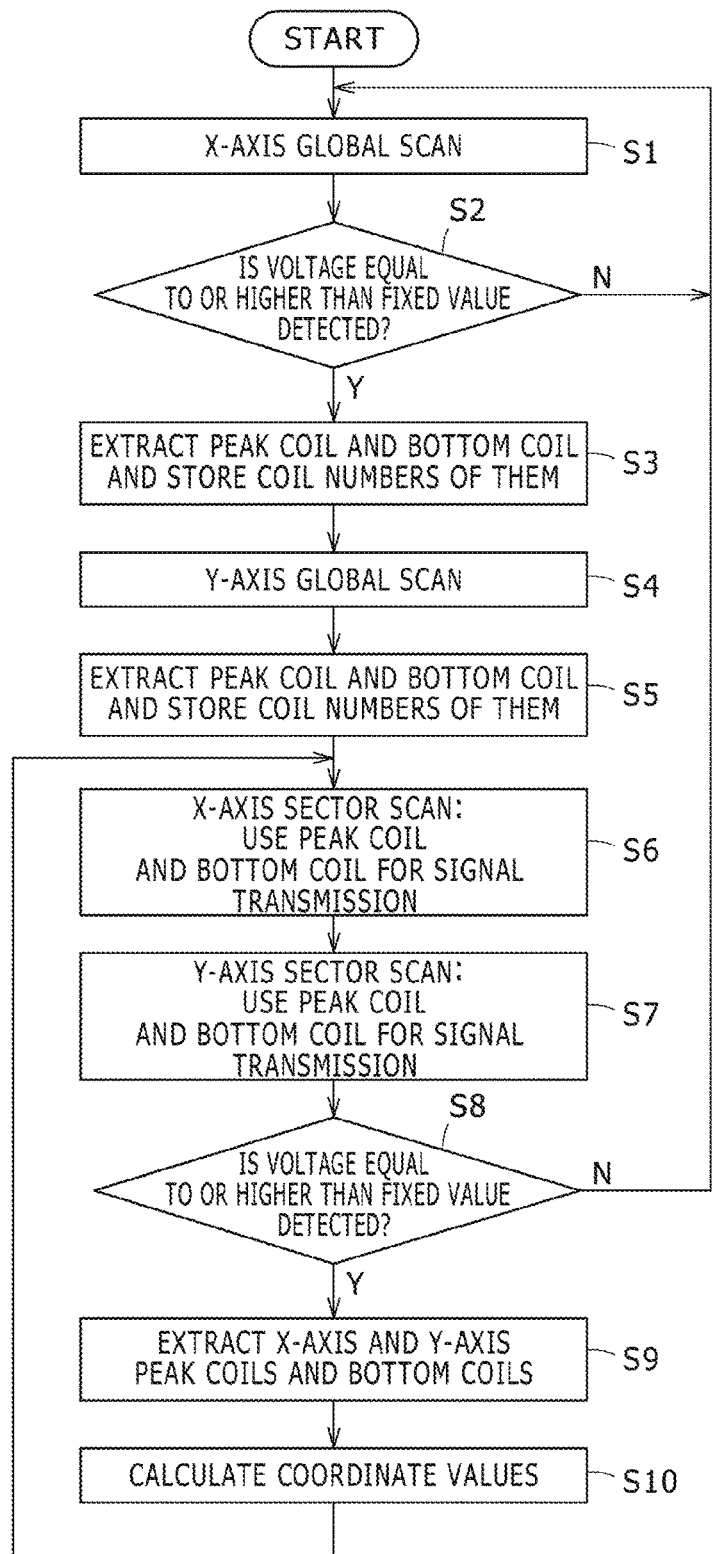
FIG. 6 is a flow chart illustrating a detection process of an indicated position executed by the position detection apparatus 10N.

A detection process of a position indicated by the position indicator 20 executed under the control of the process controlling unit 130 in the position detection apparatus 10N of the first embodiment is described with reference to a flow chart of FIG. 6. FIG. 6 is a flow chart illustrating a detection process of an indicated position executed by the position detection apparatus 10N.

First, the process controlling unit 130 executes a process of controlling the selection circuit 101 to successively select the loop coils $X_0$ to $X_n$ of the loop coil group 15X and controlling the transmission-reception switching circuit 102 to repeat supply of a signal to the loop coil selected by the selection circuit 101 and reception of a signal by the selected loop coil to detect a loop coil at which the received signal indicates the highest signal level (step S1). The process at step S1 is hereinafter referred to as X-axis global scan.

The X-axis global scan is described in detail. First, the process controlling unit 130 controls the control circuit 101 to switch, for example, the switch circuit 2X(1) connected to the first loop coil $X_0$ within the loop coil group 15X to the terminal "a" side to thereby connect the loop coil $X_0$ to the movable terminal M of the transmission-reception switching circuit 102 and simultaneously controls the transmission-reception switching circuit 102 to cause the movable terminal M to select the transmission side terminal T to thereby transmit a signal of the frequency f0 supplied thereto from the transmission signal generation circuit 110 to the loop coil $X_0$.

Then, the process controlling unit 130 controls the transmission-reception switching circuit 102 to cause the movable terminal M to select the reception side terminal R to supply a signal from the position indicator 20 received by the loop coil $X_0$ to the reception signal processing circuit 120 to detect the signal level of the reception signal. The process controlling unit 130 performs such signal transmission and reception processes for each of the loop coils $X_0$ to $X_n$ which form the loop coil group 15X to determine whether the position indicator 20 is in the proximity of or in contact with the indication inputting face 13A and determine, when the position indicator 20 is in the proximity or in contact, a loop coil in the X-axis direction just below the position indicator 20.

When the X-axis global scan is completed, the process controlling unit 130 determines whether or not there exists a loop coil at which the signal level (voltage value) of the reception signal is equal to or higher than a fixed value (step S2). The decision process at step S2 is a process for determining whether or not the position indicator 20 is within an effective reading height of the position detection apparatus 10N. If it is determined by the decision process at step S2 that there exists no loop coil at which the signal level of the reception signal is equal to or higher than the fixed value, then since this is a state in which the position indicator 20 is neither in the proximity of nor in contact with the indication inputting face 13A, the process controlling unit 130 repeats the processes at the steps beginning with step S1.

If it is determined by the decision process at step S2 that there exists a loop coil at which the signal level of the reception signal is equal to or higher than the fixed value, then the process controlling unit 130 extracts (determines), on the basis of the result of the process at step S1, a peak coil at which the signal level of the reception signal is highest and a bottom coil at which the signal level of the reception signal is lowest from among the loop coils of the loop coil group 15X, and stores coil numbers of the extracted coils (step S3). For example, in the case of the embodiment depicted in FIG. 4A, at step S3, the loop coil $X_{12}$ at which the signal level of the reception signal is highest is extracted as a peak coil, and the two loop coils $X_9$ and $X_{15}$ at which the signal level of the reception signal is lowest are extracted as bottom coils.

Then, the process controlling unit 130 executes a process of controlling the selection circuit 101 to successively select the loop coils $Y_0$ to $Y_m$ of the loop coil group 15Y and controlling the transmission-reception switching circuit 102 to repeat supply of a signal to the loop coil selected by the selection circuit 101 and reception of a signal by the selected loop coil to detect a loop coil at which the received signal indicates a high signal level (step S4). The process at step S4 is hereinafter referred to as Y-axis global scan.

At step S4, the process controlling unit 130 first controls the selection circuit 101 to switch, for example, the switch circuit 2Y(1) connected to the first loop coil $Y_0$ within the loop coil group 15Y to the terminal "a" side to thereby connect the loop coil $Y_0$ to the movable terminal M of the transmission-reception switching circuit 102 and simultaneously controls the transmission-reception switching circuit 102 to cause the movable terminal M to select the transmission side terminal T to thereby transmit a signal of the frequency f0 supplied from the transmission signal generation circuit 110 to the loop coil $Y_0$.

Then, the process controlling unit 130 controls the transmission-reception switching circuit 102 to cause the movable terminal M to select the reception side terminal R to thereby supply a signal from the position indicator 20 received by the loop coil $Y_0$ to the reception signal processing circuit 120 to detect the signal level of the reception signal. The process controlling unit 130 performs such signal transmission and reception processes as described above for the loop coils $Y_0$ to $Y_m$ configuring the loop coil group 15Y to determine whether the position indicator 20 is in the proximity of or in contact with the indication inputting face 13A and determine, where the position indicator 20 is in the proximity or in contact, a loop coil in the Y-axis direction just below the position indicator 20.

The process controlling unit 130 extracts (determines), on the basis of the result of the process at step S4, a peak coil at which the signal level of the reception signal is highest and a bottom coil at which the signal level of the reception signal is lowest from among the loop coils of the loop coil group 15Y, and stores coil numbers of the extracted coils (step S5). A decision process corresponding to the process at step S2 described above is not performed after the Y-axis global scan because, at a point of the process at step S4, it has been determined by the decision process at step S2 that the position indicator 20 is within the effective reading height of the position detection apparatus 10N and there is no need to perform the decision process again.

Alternatively, in the processes at steps S1 and S4, the process controlling unit 130 need not select all loop coils of the loop coil groups 15X and 15Y but may select the loop coils in a skipping manner such that it selects every other loop coil or every third loop coil. Alternatively, transmission and reception of signals to and from one loop coil may be performed a plural number of times. Furthermore, although transmission time periods or the reception time periods for each of the loop coils should be the same, the transmission time period and the reception time period need not be the same.

The process controlling unit 130 performs X-axis sector scan, which is a process of performing transmission and reception of signals to and from a predetermined number of loop coils, for example, five loop coils, which are centered at the peak coil within the loop coil group 15X and include loop coils neighboring the peak coil (step S6). In the signal transmission and reception, when a signal is transmitted from a loop coil, that is, when the transmission side terminal T is selected by the transmission-reception switching circuit 102, the process controlling unit 130 controls the selection circuit 101 to transmit signals from the peak coil and the bottom coils.

Specifically, the process controlling unit 130 controls the selection circuit 101 such that switching to the terminal "a" side is performed for the switch circuit 2X connected to the peak coil and switching to the terminal "b" side is performed for the switch circuits 2X connected to the bottom coils. Based on such control, a signal corresponding to the signal (first signal) from the transmission signal generation circuit 110 is transmitted from the peak coil, and a signal corresponding to a signal (second signal) having a phase inverted from that of the signal (first signal) from the transmission signal generation circuit 110 is transmitted from each of the bottom coils. Accordingly, a signal can be transmitted to the position indicator 20, while avoiding a situation that a signal transmitted from the peak coil and signals transmitted from the bottom coils cancel each other.

On the other hand, when a signal from the position indicator 20 is received, that is, when the reception side terminal R is selected by the transmission-reception switching circuit 102, the process controlling unit 130 switches the loop coils (in the present example, five loop coils) in an ascending order (or a descending order) of the coil numbers. Based on the X-axis sector scan, the position indicated by the position indicator 20 can be precisely specified in the proximity of the peak coil.

The process controlling unit 130 performs Y-axis sector scan, which is a process of performing transmission and reception of signals to and from a predetermined number of loop coils, for example, five loop coils, which are centered at the peak coil within the loop coil group 15Y and include loop coils neighboring the peak coil (step S7). In the signal transmission and reception, when a signal is transmitted from a loop coil, that is, when the transmission side terminal T is selected by the transmission-reception switching circuit 102, the process controlling unit 130 controls the selection circuit 101 to transmit signals from the peak coil and the bottom coils.

Specifically, the process controlling unit 130 controls the selection circuit 101 such that switching to the terminal "a" side is performed for the switch circuit 2Y connected to the peak coil and switching to the terminal "b" side is performed for the switch circuits 2Y connected to the bottom coils. Based on such control, a signal corresponding to the signal (first signal) from the transmission signal generation circuit 110 is transmitted from the peak coil, and a signal corresponding to a signal (second signal) having a phase inverted from that of the signal (first signal) from the transmission signal generation circuit 110 is transmitted from each of the bottom coils. Accordingly, a signal can be transmitted to the position indicator 20, while avoiding a situation that a signal transmitted from the peak coil and signals transmitted from the bottom coils cancel each other.

On the other hand, when a signal from the position indicator 20 is received, that is, when the reception side terminal R is selected by the transmission-reception switching circuit 102, the process controlling unit 130 switches the loop coils (in the present example, five loop coils) in an ascending order (or a descending order). Based on the Y-axis sector scan, the position indicated by the position indicator 20 can be precisely specified in the proximity of the peak coil.

After the Y-axis sector scanning operation at step S7 is completed, the process controlling unit 130 determines whether or not the highest values of the signal levels of the reception signal obtained by the processes at steps S6 and S7 are equal to or higher than a fixed value set in advance (step S8). The decision process at step S8 is a process for deciding whether or not the position indicator 20 is within the effective reading height of the position detection apparatus 10N. If it is determined by the decision process at step S8 that there exists no loop coil at which the signal level of the reception signal is equal to or higher than the fixed value, then the process controlling unit 130 determines that the position indicator 20 is in a state in which the position indicator 20 is neither in the proximity of nor in contact with the indication inputting face 13A, and repeats the processes at the steps beginning with step S1.

On the other hand, if it is determined by the decision process at step S8 that there exists a loop coil at which the signal level of the reception signal is equal to or higher than the fixed value, then the process controlling unit 130 extracts (determines), on the basis of the results of the processes of the X-axis sector scan at step S6 and the Y-axis sector scan at step S7, a peak coil and bottom coils in each of the loop coil group 15X and the loop coil group 15Y.

In the X-axis sector scan at step S6 and the Y-axis sector scan at step S7, transmission and reception of signals are performed with regard to a predetermined number of loop coils centered at the peak coil. Thus, there may be a situation in which a bottom coil does not exist among the predetermined number of coils. In this case, bottom coils corresponding to the peak coil extracted at step S9 may be extracted (determined) on the basis of the positional relationship between the peak coil and the bottom coils extracted by the processes at steps S1 to S5.

Specifically, if the loop coil $X_{12}$ is extracted as a peak coil and the loop coils $X_9$ and $X_{15}$ are extracted as bottom coils as depicted in FIG. 4A, then the bottom coils corresponding to the peak coil are loop coils at positions spaced by a three-coil distance forwardly and rearwardly from the peak coil. Therefore, at step S9, if the peak coil is extracted, then on the basis of the positional relationship between the peak coil and the bottom coils extracted by the processes at steps S1 to S5, loop coils at positions spaced by, for example, a three-coil distance forwardly and rearwardly from the peak coil are extracted (determined) as the bottom coils.

The process controlling unit 130 calculates, on the basis of the position of the peak coil of the loop coil group 15X and the position of the peak coil of the loop coil group 15Y extracted at step S9, coordinate values indicative of the position indicated on the indication inputting face 13A by the position indicator 20 (step S10). The coordinate values calculated here are supplied to, for example, the LCD controller (not shown) provided on the mother board MB and are used for display control and so forth. Then, the process controlling unit 130 repeats the processes at the steps beginning with step S6.

In this manner, in the position detection apparatus 10N incorporated in the electronic apparatus 10 of the first embodiment, a peak coil and bottom coils are extracted by the X-axis global scan and the Y-axis global scan. In other words, in the position detection apparatus 10N, a peak coil and bottom coils, from which signals are transmitted, are specified on the basis of a reception signal distribution on the sensor 13 of a reflection signal transmitted from the position indicator 20.

When a signal is transmitted to the position indicator 20 in the X-axis sector scan and the Y-axis sector scan, a signal transmitted from the peak coil and signals transmitted from the bottom coils can be transmitted such that they do not cancel each other. Consequently, a signal transmitted from the sensor 13 to the position indicator 20 can be increased (enhanced). Furthermore, there is no need to upsize the loop coils of the sensor 13 or to drive the transmission signal generation circuit with a high voltage or high current.

Second Embodiment FIGS. 7 to 12

[Configuration of Electronic Apparatus 10A]

A configuration of an electronic apparatus 10A of a second embodiment is described with reference to FIGS. 7 and 8.

The electronic apparatus 10 of the present example is a high function mobile phone terminal called a smartphone, similarly to the electronic apparatus 10 of the first embodiment. In the description of the present second embodiment, an exemplary electronic apparatus 10A includes, in addition to the sensor 13 disposed in an overlapping relationship with the display screen 12, auxiliary inputting units 14A and 14B which are provided in a peripheral region of the display screen 12 and which have, for example, a touch sensor function.

Figure 7A:
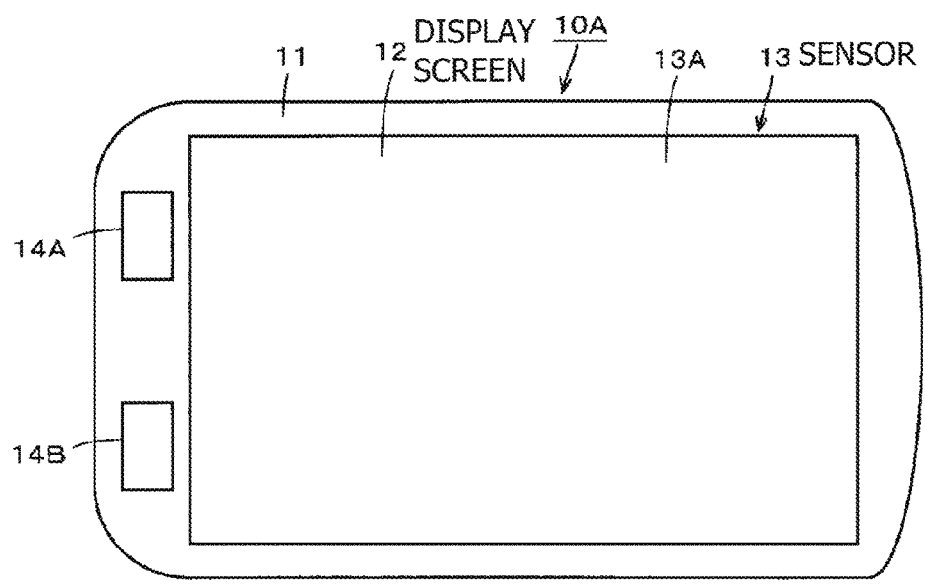
Figure 7B:
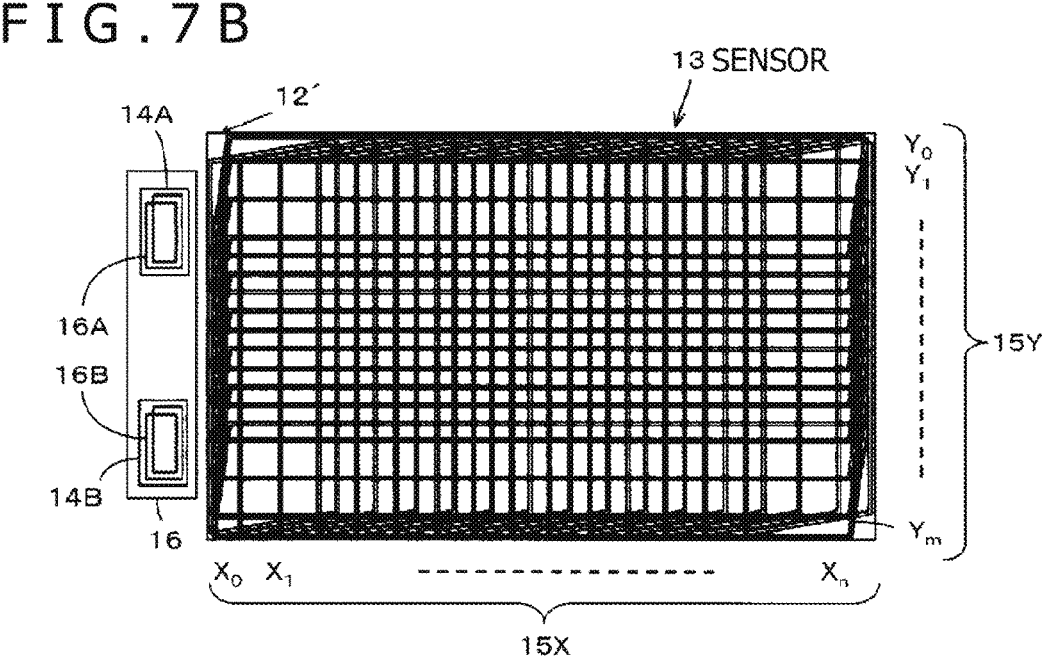

As depicted in FIGS. 7A and 7B, the auxiliary inputting units 14A and 14B include corresponding loop coils 16A and 16B provided thereon, respectively. Except for these aspects described above, the electronic apparatus 10A of the second embodiment is configured substantially similarly to the electronic apparatus 10 of the first embodiment. Therefore, in FIGS. 7 to 12 with reference to which the electronic apparatus 10A of the second embodiment is described, like or corresponding elements to those in the electronic apparatus 10 of the first embodiment described above with reference to FIGS. 1 to 6 are denoted by the same reference symbols, and overlapping detailed description thereof is omitted to avoid redundancy.

As depicted in FIG. 7A, the electronic apparatus 10A of the second embodiment includes the auxiliary inputting units 14A and 14B, which are provided in a region different from that of the display screen 12 but are positioned in the proximity of the display screen 12 on one side (the left side in FIG. 7) in a longitudinal direction (X-axis direction) of the housing 11. The auxiliary inputting units 14A and 14B are configured such that, for example, a capacitive sensor is disposed therein, and a specific function having a high use frequency such as a menu displaying function or a canceling function of an application is allocated to each of the auxiliary inputting units 14A and 14B. Further, at portions of the housing 11 corresponding to the auxiliary inputting units 14A and 14B, an auxiliary sensor 16 of the electromagnetic induction type similar to the sensor 13 is provided as depicted in FIG. 7B. The auxiliary sensor 16 includes the loop coils 16A and 16B corresponding to the auxiliary inputting units 14A and 14B, respectively.

Although the loop coils 16A and 16B of the auxiliary sensor 16 may each be formed of a transparent conductor on a transparent substrate, since the auxiliary sensor 16 does not overlap with the display screen 12, the loop coils 16A and 16B may be formed of an opaque conductor on an opaque substrate.

[Configuration of Position Detection Apparatus 10X Incorporated in Electronic Apparatus 10A]

An embodiment of a configuration of the position detection apparatus 10X incorporated in the electronic apparatus 10A is described with reference to FIG. 8. The position detection apparatus 10X is configured such that the sensor 13 and the auxiliary sensor 16 are connected, through a connector (not shown), to a sensor controller 100A provided on the mother board MB. The sensor controller 100A functions as a control circuit for the position detection apparatus 10X.

In the example of FIG. 8, a circuit configuration of the position indicator 20 used to provide input to the sensor 13 and the auxiliary sensor 16 are depicted, which are sensors of the electromagnetic induction type for example. The position indicator 20 is the same as the position indicator 20 in the first embodiment.

The sensor controller 100A performs control similar to that of X-axis global scan, Y-axis global scan, X-axis sector scan and Y-axis sector scan in the first embodiment for a plurality of loop coils $X_0$ to $X_n$ and a plurality of loop coils $Y_0$ to $Y_m$ of the loop coil groups 15X and 15Y of the sensor 13, similarly to the sensor controller 100 in the electronic apparatus 10 of the first embodiment, and controls a detection process of the position indicator 20 using the two loop coils 16A and 16B of the auxiliary sensor 16.

The sensor controller 100A performs, based on the results of the X-axis global scan, Y-axis global scan, X-axis sector scan and Y-axis sector scan in the sensor 13, a detection process of a position indicated by the position indicator 20 on the indication inputting face 13A. Further, the sensor controller 100A performs, based on a result of detection regarding the two loop coils 16A and 16B provided on the auxiliary sensor 16, a detection process of whether or not the position indicator 20 is detected by one of the auxiliary inputting units 14A and 14B.

When the position indicator 20 is not detected by any of the indication inputting face 13A corresponding to the display screen 12 and the auxiliary inputting units 14A and 14B, the sensor controller 100A controls the sensor 13 to perform global scan for all of the loop coils $X_0$ to $X_n$ and $Y_0$ to $Y_m$ of the sensor 13 and controls the auxiliary sensor 16 to perform a detection process alternately for the loop coils 16A and 16B at predetermined time intervals.

When the position indicator 20 is detected on the indication inputting face 13A, the sensor controller 100A controls the sensor 13 to perform X-axis sector scan and Y-axis sector scan, using a plurality of loop coils in the proximity of the detected position of the position indicator 20, while controlling the auxiliary sensor 16 to, for example, stop use of the auxiliary sensor 16 to detect the position indicator 20.

When the position indicator 20 is detected by one of the auxiliary inputting units 14A and 14B, the sensor controller 100A alternately scans the loop coils 16A and 16B at predetermined time intervals. In this case, the sensor controller 100A controls the sensor 13 to stop use of the sensor 13 to detect the position indicator 20. At this time, only with regard to loop coils in a peripheral edge portion of the sensor 13 adjacent to the auxiliary sensor 16, detection may be partially performed at a defined speed.

In this manner, the position detection apparatus 10X of the present example includes the sensor 13 and the auxiliary sensor 16, by each of which a detection operation of the position indicator 20 is performed. Therefore, as depicted in FIG. 8, the position detection apparatus 10X includes the loop coils 16A and 16B of the auxiliary sensor 16, sensor switching circuits 103 and 104, a transmission-reception switching circuit 105 and a selection circuit 106, in contrast to the position detection apparatus 10N of the first embodiment depicted in FIG. 3.

In the position detection apparatus 10X of the present second embodiment, the loop coils 16A and 16B of the auxiliary sensor 16 are smaller than the loop coils configuring the loop coil group 15X and the loop coil group 15Y. Therefore, from only the loop coil 16A or 16B of the auxiliary sensor 16, a signal of sufficient energy may not be supplied to the position indicator 20.

Therefore, in the position detection apparatus 10X of the second embodiment, when detecting the position indicator 20 using the loop coil 16A or 16B of the auxiliary sensor 16, signals are transmitted not only from the loop coil 16A or 16B but also from a loop coil of the adjacent sensor 13 simultaneously. In this case, a loop coil of the loop coil group 15X at which the reception signal indicates the lowest signal level when the loop coil 16A or the loop coil 16B receives a signal from the position indicator 20 is used.

By such measures as described above, it is possible to transmit a signal from a loop coil, which greatly affects the position indicator 20 to thereby efficiently supply a signal of sufficient energy to the position indicator 20, similarly to the position detection apparatus 10N of the first embodiment.

In the following, an example of a configuration of the position detection apparatus 10X of the second embodiment is described in detail.

The position detection apparatus 10X is formed of the sensor 13, the auxiliary sensor 16 and the sensor controller 100A. The position detection apparatus 10X and the position indicator 20 form an inputting apparatus (inputting device) of the electronic apparatus 10.

The sensor controller 100A connected to the sensor 13 functions as a control circuit for the position detection apparatus 10X. The sensor controller 100A includes the selection circuit 101, the transmission-reception switching circuit 102, the transmission signal generation circuit 110, the reception signal processing circuit 120, the sensor switching circuits 103 and 104, the selection circuit 106 and a process controlling unit 130A.

The sensor switching circuit 103 is a circuit for selectively supplying a signal supplied thereto from the transmission signal generation circuit 110 to the sensor 13 and the auxiliary sensor 16 under the control of the process controlling unit 130A. The sensor switching circuit 103 is connected at a movable terminal M thereof to the output terminal of the transmission signal generation circuit 110, and connected at a terminal D thereof to the transmission side terminal T of the transmission-reception switching circuit 102, and connected at a terminal K thereof to the transmission side terminals T of the transmission-reception switching circuits 102 and 105.

The sensor switching circuit 104 is a circuit for selectively connecting the sensor 13 or the auxiliary sensor 16 to the reception signal processing circuit 120 at the succeeding stage under the control of the process controlling unit 130A. The sensor switching circuit 104 has one movable terminal M and terminals K and D, and is connected at the movable terminal M thereof to the input terminal of the reception signal processing circuit 120, at the terminal D thereof to the reception side terminal R of the transmission-reception switching circuit 102, and at the terminal K thereof to the reception side terminal R of the transmission-reception switching circuit 105.

The transmission-reception switching circuit 105 is a circuit for switching between transmission and reception of a signal in the auxiliary sensor 16 under the control of the process controlling unit 130A. The transmission-reception switching circuit 105 has the terminals R and T and a movable terminal M, and is connected at the terminal R thereof to the terminal K of the sensor switching circuit 104, at the terminal T thereof to the terminal K of the sensor switching circuit 103, and at the movable terminal M thereof to the output terminal of the selection circuit 106 hereinafter described. The transmission-reception switching circuit 105 switches the connection destination (transmission side terminal T or reception side terminal R), to which the loop coil selected by the selection circuit 106 is connected after every predetermined time period under the control of the process controlling unit 130A, such that switching between transmission and reception is performed time-divisionally similarly as in the transmission-reception switching circuit 102.

The selection circuit 106 is a circuit for selectively connecting the transmission signal generation circuit 110 or the reception signal processing circuit 120 to one of the loop coils 16A and 16B of the auxiliary sensor 16 through the transmission-reception switching circuit 105 under the control of the sensor controller 100A. The selection circuit 106 has two input terminals and one output terminal, and is connected at one of the input terminals thereof to the loop coil 16A, at the other one of the input terminals thereof to the loop coil 16B, and at the output terminal thereof to the movable terminal M of the transmission-reception switching circuit 105. Thus, the selection circuit 106 selects one of the loop coils 16A and 16B under the control of the process controlling unit 130A.

The sensor switching circuit 103 and the sensor switching circuit 104 are switched to the terminal D when the position indicator 20 is detected by the sensor 13, and to the terminal K side when the position indicator 20 is detected by the auxiliary sensor 16, under the control of the process controlling unit 130A. The terminal K of the sensor switching circuit 103 is connected to the transmission side terminals T of the transmission-reception switching circuit 102 and the transmission-reception switching circuit 105 under the control of the process controlling unit 130A, so as to achieve transmission of signals to the position indicator 20 not only from the loop coil 16A or the loop coil 16B but also from an adjacent loop coil of the loop coil group 15X.

The process controlling unit 130A is a circuit for controlling the components of the sensor controller 100A. Specifically, the process controlling unit 130A performs selection control of a loop coil by the selection circuit 101 and the selection circuit 106, and performs switching control of the sensor switching circuit 103, the sensor switching circuit 104, the transmission-reception switching circuit 102 and the transmission-reception switching circuit 105. Further, the process controlling unit 130A performs a detection process of a position indicated by the position indicator 20 using the sensor 13 as well as a detection process of the position indicator 20 using the auxiliary sensor 16.

In such a configuration as described above, upon detection of the position indicator 20 by the sensor 13, the process controlling unit 130A switches the sensor switching circuit 103 and the sensor switching circuit 104 to the terminal D side. Consequently, the output terminal of the transmission signal generation circuit 110 is connected to the transmission side terminal T of the transmission-reception switching circuit 102 through the sensor switching circuit 103, and the reception side terminal R of the transmission-reception switching circuit 102 is connected to the input terminal of the reception signal processing circuit 120 through the sensor switching circuit 104.

Then, when the transmission-reception switching circuit 102 selects the transmission side terminal T (upon transmission), an AC signal from the current driver 112 is supplied to the loop coil selected by the selection circuit 101. Consequently, to the loop coil selected by the selection circuit 101 within the loop coil group 15X or the loop coil group 15Y, the signal from the transmission signal generation circuit 110 is supplied, and from the loop coil, a corresponding signal is sent out. At this time, when the position indicator 20 is positioned in the proximity of the loop coil, the resonance circuit of the position indicator 20 receives the signal sent out from the loop coil and accumulates energy.

On the other hand, when the transmission-reception switching circuit 102 selects the reception side terminal R (at a time for reception), a signal according to the induced voltage generated in the loop coil selected by the selection circuit 101 is supplied to the reception signal processing circuit 120. Consequently, in the loop coils of the loop coil group 15X and the loop coil group 15Y, when the position indicator 20 indicates a position on the sensor 13, an induced voltage is generated by a reflection signal transmitted from the position indicator 20. In this case, a signal from the loop coil of the loop coil group 15X or the loop coil group 15Y selected by the selection circuit 101 is supplied to the reception signal processing circuit 120, and the signal level of the reception signal is detected and used for calculation of the indicated position.

In the position detection apparatus 10X of the present second embodiment also, X-axis global scan, X-axis sector scan, Y-axis global scan and Y-axis sector scan of the loop coil group 15X and the loop coil group 15Y of the sensor 13 are performed. Then, at least during sector scanning, a signal is transmitted from a peak coil, which is a loop coil at which the signal level of a reception signal detected during global scan is highest, and from bottom coils, which are loop coils at which the signal level of a reception signal is lowest. Also in this case, similarly as in the case of the first embodiment, a second signal formed by inverting the phase of the first signal supplied to the peak coil so as to have an opposite phase is supplied to the bottom coils. Consequently, in the detection process of the position indicator 20 with respect to the sensor 13, a signal of sufficient energy can be transmitted efficiently to the position indicator 20.

In a detection process of the position indicator 20 using the auxiliary sensor 16, the process controlling unit 130A switches the sensor switching circuit 103 and the sensor switching circuit 104 to the terminal K side. Consequently, the output terminal of the transmission signal generation circuit 110 is connected to the transmission side terminals T of the transmission-reception switching circuits 102 and 105 through the sensor switching circuit 103. Further, the reception side terminals R of the transmission-reception switching circuits 102 and 105 are connected to the input terminal of the reception signal processing circuit 120 through the sensor switching circuit 104.

In this case, the selection circuit 106 alternately selects the loop coils 16A and 16B under the control of the process controlling unit 130A. Then, when the selection circuit 106 selects the loop coil 16A, the controlling unit 130A controls the transmission-reception switching circuit 105 to perform transmission of a signal to and reception of a signal from the position indicator 20 using the loop coil 16A. Similarly, when the selection circuit 106 selects the loop coil 16B, the controlling unit 130A controls the transmission-reception switching circuit 105 to perform transmission of a signal to and reception of a signal from the position indicator 20 using the loop coil 16B. In this manner, transmission and reception of signals are performed using the loop coils 16A and 16B, and which one of the loop coils 16A and 16B is receiving a signal from the position indicator 20 can be detected.

Figure 9:
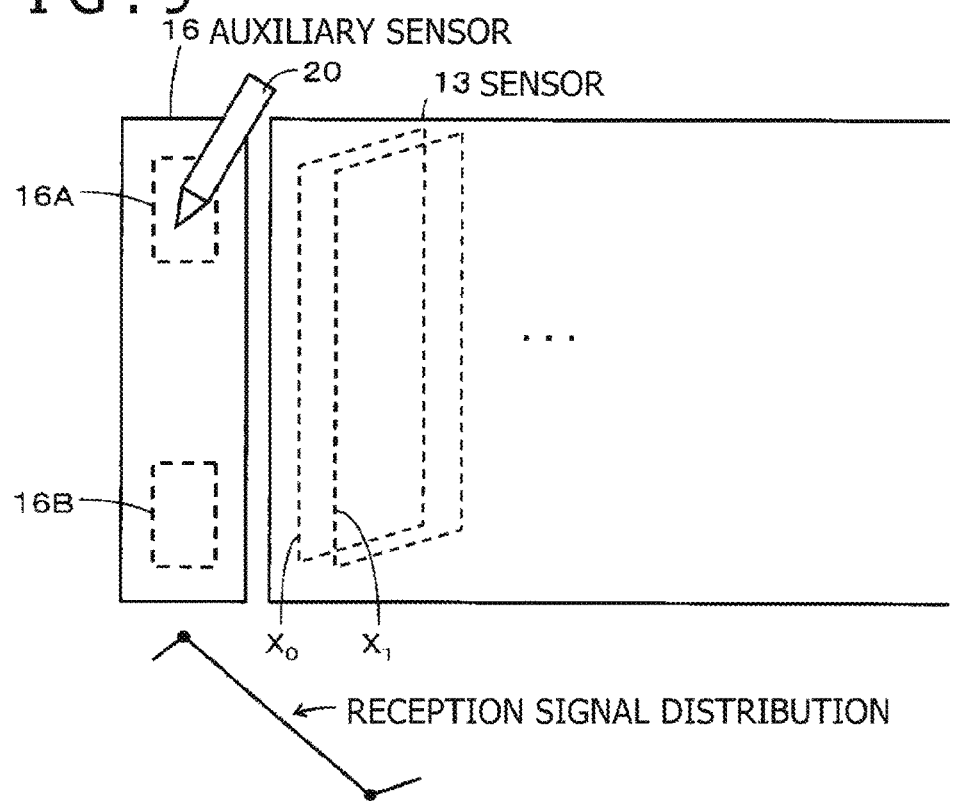
FIG. 9 is a view illustrating a process where a signal is transmitted from a loop coil 16A or 16B.
Figure 10:
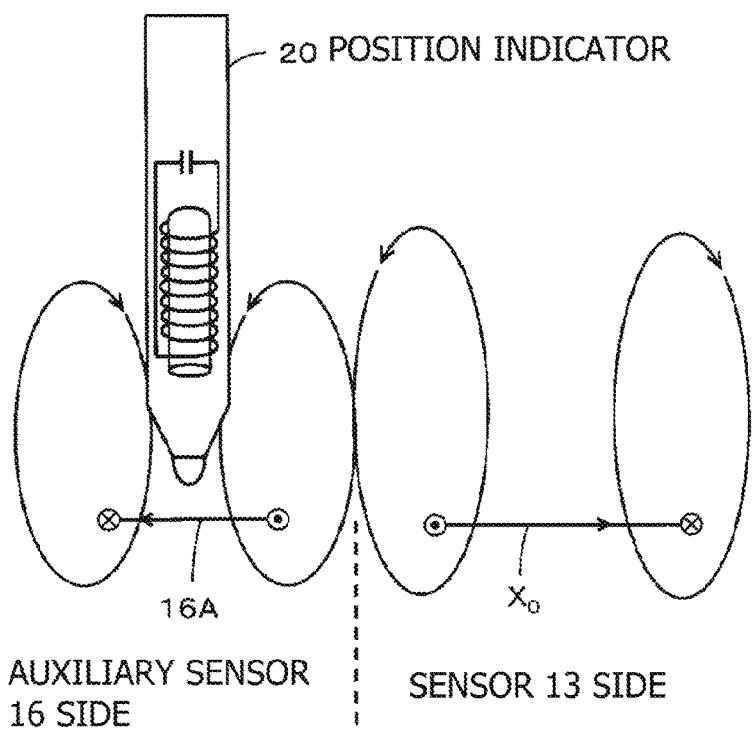
FIG. 10 is a view illustrating a process where a signal is transmitted from the loop coil 16A or 16B.

In the position detection apparatus 10X of the present example, when the position indicator 20 is detected by the auxiliary sensor 16, and when a signal is transmitted from the loop coil 16A or 16B, a signal is transmitted also from an adjacent loop coil of the loop coil group 15X. FIGS. 9 and 10 are views illustrating a process performed when a signal is transmitted from the loop coil 16A or 16B.

As depicted in FIG. 9, when the position indicator 20 is positioned on the loop coil 16A or 16B of the auxiliary sensor 16, the process controlling unit 130A measures the signal level of the reception signal of each loop coil of the auxiliary sensor 16 and the sensor 13. In this case, the reception signal distribution on the sensor coils may be, for example, as indicated by a graph of a reception signal distribution depicted in the lower part of FIG. 9, similarly as in the case of the first embodiment (FIG. 4). Specifically, the signal level of the reception signal is highest at the loop coil 16A or 16B of the auxiliary sensor 16, and the signal level of the reception signal of the loop coil $X_0$ of the loop coil group 15X adjacent to the loop coil 16A or 16B is lowest. Further, the signal level of the reception signal gradually rises as the distance from the loop coil 16A or 16B at which the signal level of the reception signal is lowest increases until the level value converges in the proximity of "0."

Here, assuming that the signal level of the reception signal is lowest at the loop coil $X_0$ of the loop coil group 15X as in the graph of the reception signal distribution depicted in the lower part of FIG. 9, when the position indicator 20 is positioned on the loop coil 16A or 16B, if a signal is transmitted from the loop coil 16A or the loop coil 16B just below the position indicator 20 and from the loop coil $X_0$ of the loop coil group 15X, then a signal can be supplied efficiently to the position indicator 20.

Therefore, in the position detection apparatus 10X of the present embodiment, if the position indicator 20 is detected by the auxiliary sensor 16, then a signal is transmitted from the loop coil 16A or 16B and the loop coil $X_0$ of the loop coil group 15X. However, similarly as in the case of the first embodiment, if the direction of an induced magnetic field generated in the loop coil $X_0$ of the loop coil group 15X is opposite to the direction of an induced magnetic field generated in the loop coil 16A or 16B, then the induced magnetic fields cancel each other.

Therefore, to the loop coil 16A or 16B, a signal from the transmission signal generation circuit 110 is supplied as it is, and a signal corresponding to the supplied signal is transmitted to the position indicator 20. On the other hand, a signal from the transmission signal generation circuit 110 is inverted in phase such that a signal of an opposite phase to that of the signal from the transmission signal generation circuit 110 is supplied to the loop coil $X_0$ of the loop coil group 15X, and a signal corresponding to this signal is transmitted to the position indicator 20. Consequently, as depicted in FIG. 10, since magnetic fluxes provided by a signal transmitted from the loop coil 16A or 16B and a signal transmitted from the loop coil $X_0$ have the same direction, the signals do not cancel each other, and a signal supplied to the position indicator 20 can be increased.

In other words, by using both of the loop coils 16A and 16B of the auxiliary sensor 16 and a loop coil of the loop coil group 15X neighboring with the loop coils 16A and 16B to transmit signals, a signal transmitted to the position indicator 20 can be increased and sufficient power can be supplied to the capacitor 20C of the resonance circuit of the position indicator 20.

[Control Process of Process Controlling Unit 130A]

A detection process of a position indicated by the position indicator 20 executed by the position detection apparatus 10X of the second embodiment under the control of the process controlling unit 130A is described with reference to flow charts of FIGS. 11 and 12.

Figure 11:
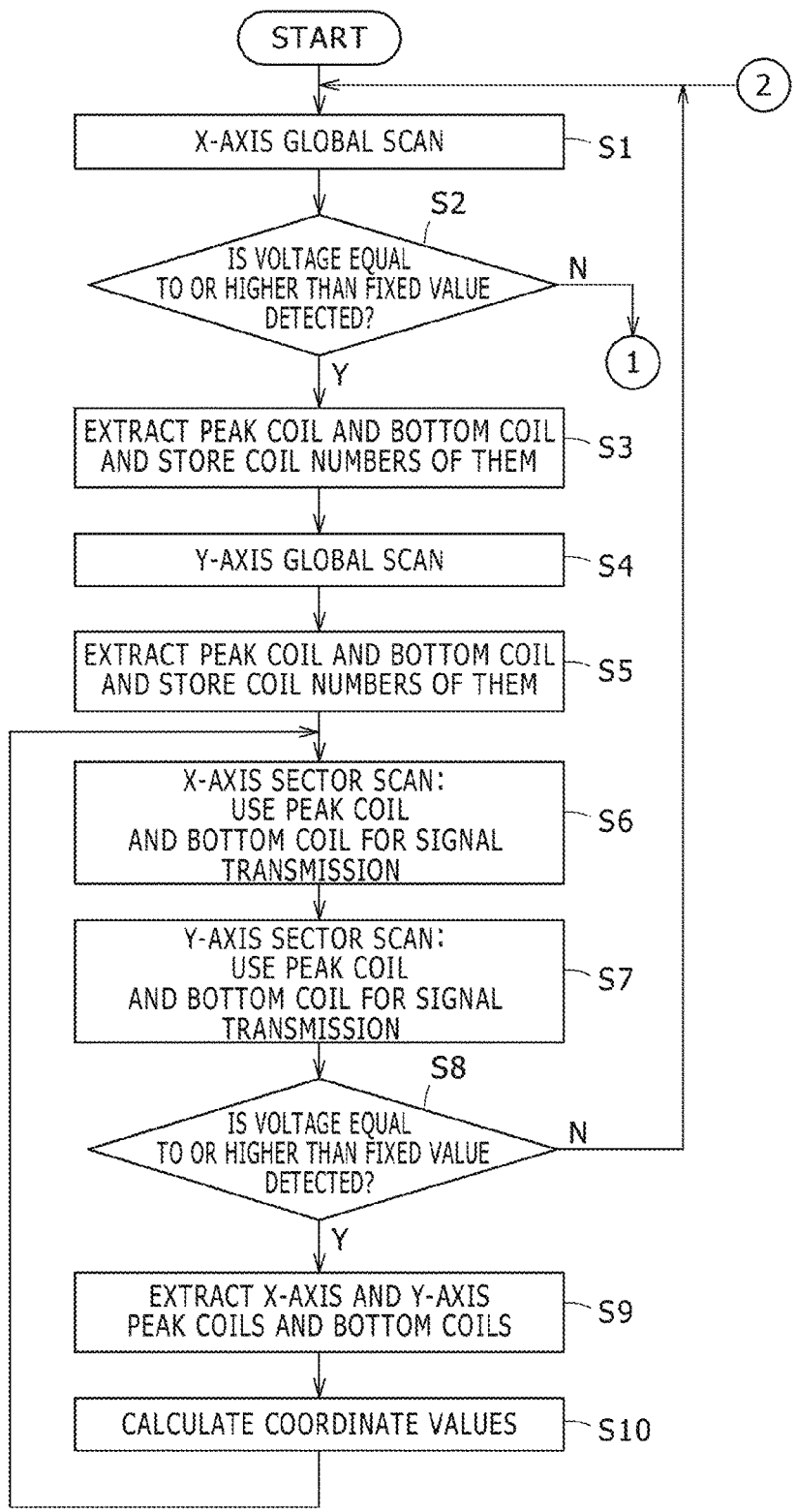
FIG. 11 is a flow chart illustrating a detection process of an indicated position executed by the position detection apparatus 10X.

Processes at steps of the flow chart depicted in FIG. 11 are similar to the processes performed at the corresponding steps depicted in FIG. 6. In particular, the processes at steps S1 to S10 depicted in FIG. 11 correspond to a detection process by the sensor 13. Therefore, description of steps S1 to S10 of FIG. 11 is omitted herein because it overlaps with the description in reference to FIG. 6 above.

Figure 12:
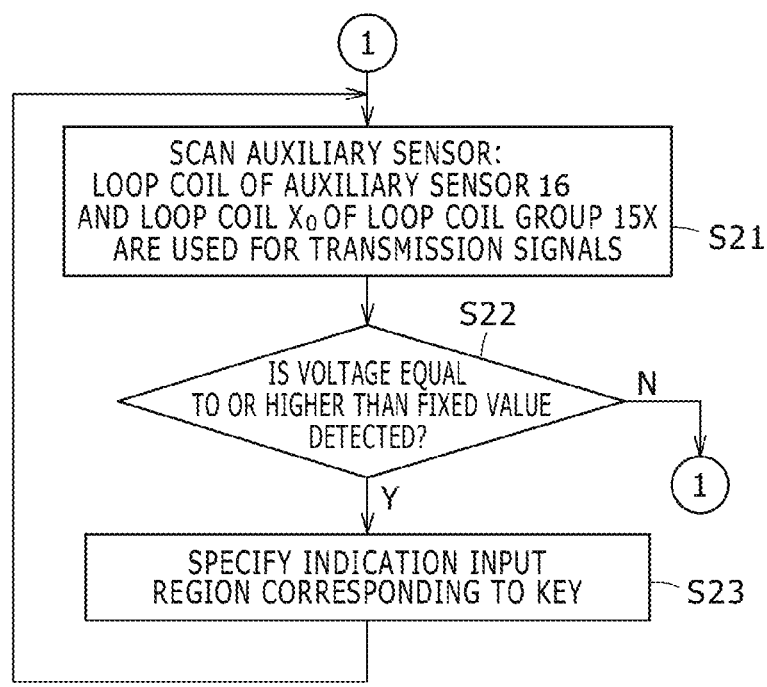
FIG. 12 is a flow chart continued from FIG. 11.

When it is determined by the decision process at step S2 after the X-axis global scan process at step S1 that there exists no loop coil at which the signal level of the reception signal is equal to or higher than the fixed value, that is, when it is determined that the position indicator 20 is neither in the proximity of nor in contact with the indication inputting face 13A, the process controlling unit 130A of the position detection apparatus 10X of the second embodiment advances its processing to a process at step S21 of FIG. 12.

In this case, the process controlling unit 130A controls the components to perform a detection process by the auxiliary sensor 16 (step S21). In particular, transmission of a signal is performed using not only the loop coil 16A or the loop coil 16B of the auxiliary sensor 16 but also the loop coil $X_0$ of the loop coil group 15X. Consequently, a signal can be supplied efficiently to the position indicator 20.

After the process at step S21, when the detection of the position indicator 20 by the auxiliary sensor 16 is completed, the process controlling unit 130A determines whether or not the signal level (voltage value) of the reception signal of the loop coil 16A or the loop coil 16B is equal to or higher than a fixed value (step S22). The decision process at step S22 is a process for deciding whether or not the position indicator 20 is positioned within the effective reading height of the auxiliary sensor 16. If it is determined by the decision process at step S22 that there exists no loop coil at which the signal level of the reception signal is equal to or higher than the fixed value, then since the position indicator 20 is neither in the proximity of nor in contact with the auxiliary sensor 16, the process controlling unit 130A returns the processing to step S1 to repeat the processes at the steps beginning with step S1.

If it is determined by the decision process at step S22 that there exists a loop coil at which the signal level of the reception signal is equal to or higher than the fixed value, then it is determined whether the loop coil just below the position indicator 20 is the loop coil 16A or the loop coil 16B (step S23). In other words, the process at step S23 is a process for specifying which one of the auxiliary inputting unit 14A and the auxiliary inputting unit 14B is selected.

Consequently, a process allocated to the selected one of the auxiliary inputting unit 14A and the auxiliary inputting unit 14B is executed. Then, after the process at step S23, the processes at the steps beginning with step S21 of FIG. 12 are repeated to continue the detection process by the auxiliary sensor 16.

In this manner, the position detection apparatus 10X incorporated in the electronic apparatus 10A of the second embodiment can supply sufficient energy to the position indicator 20 also during a detection process by the auxiliary sensor 16. Accordingly, the loop coils 16A and 16B of the auxiliary sensor 16 need not be upsized, and there is no need to upsize the transmission signal generation circuit either.

[Utilization of Reverse Wound Coil]

In the first and second embodiments described above, a signal from the transmission signal generation circuit 110 is supplied as it is to a peak coil while a signal obtained by inverting the phase of the signal from the transmission signal generation circuit 110 is supplied to a bottom coil. However, the embodiments described herein are not limited to this configuration as long as a signal transmitted from a peak coil and a signal transmitted from a bottom coil can be transmitted such that they do not cancel each other. For example, if a bottom coil is wound in the opposite direction to that of a peak coil, then sufficient energy can be supplied to the position indicator 20 without having to invert the phase of a signal to be supplied to a bottom coil.

Figure 13A:
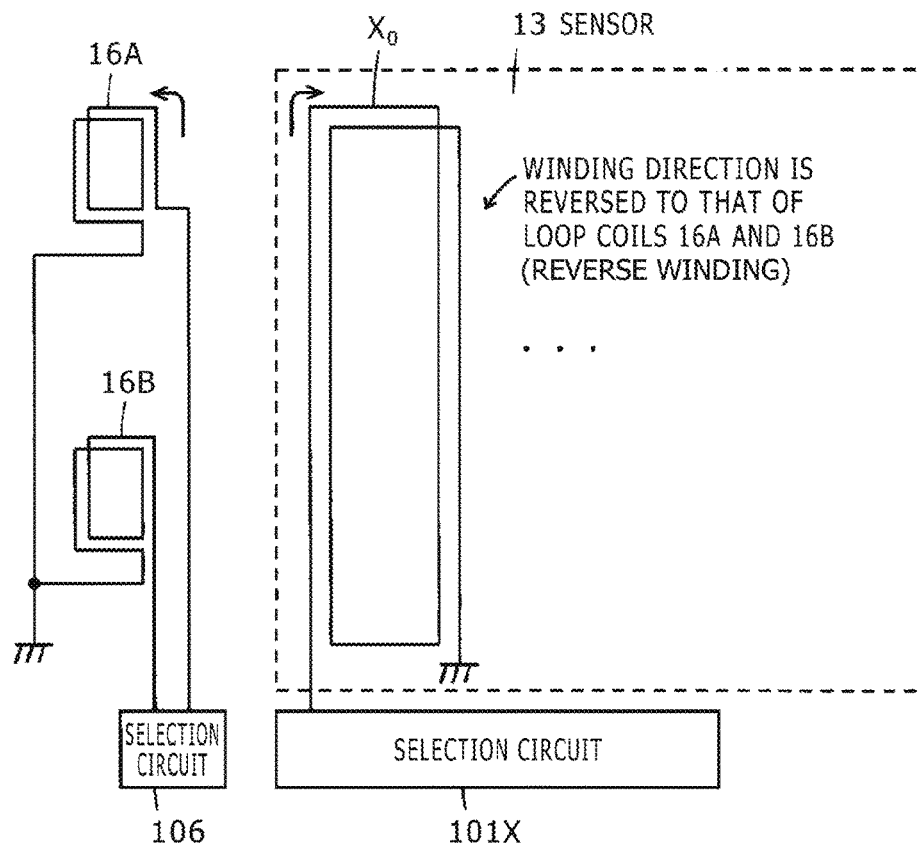
FIGS. 13A and 13B depict a particular example of a case in which a reversely-wound coil is used.

A particular example in which a reverse wound coil is used is described with reference to FIG. 13. Here, description is given exemplifying a case in which, as depicted in FIG. 13A, the auxiliary sensor 16 is provided in addition to the sensor 13 similarly as in the case of the position detection apparatus 10X of the second embodiment described above. In the illustrated example, the loop coil 16A or 16B of the auxiliary sensor 16 is positioned just below the position indicator 20 such that the loop coil 16A or 16B serves as a peak coil and the loop coil $X_0$ of the sensor 13 serves as a bottom coil.

Figure 13B:
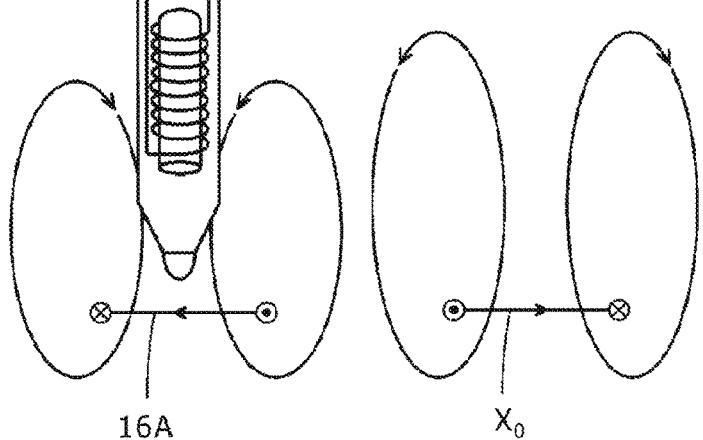

In this case, the winding direction of the bottom coil $X_0$ is set to the opposite direction to that of the loop coils 16A and 16B, each serving as a peak coil as depicted in FIG. 13A. If the winding directions are set in this manner, then the direction of a magnetic field to be generated by the loop coil $X_0$ is set to be the same as that of magnetic fields to be generated by the loop coils 16A and 16B such that the magnetic fields do not cancel each other as depicted in FIG. 13B, without having to supply a signal having an inverted phase to the loop coil $X_0$ serving as a bottom coil.

As depicted in FIGS. 3 and 8, the sensor 13 is formed of the loop coil group 15X and the loop coil group 15Y each formed of a plurality of loop coils. The loop coils $X_0$ to $X_n$ of the loop coil group 15X and the loop coils $Y_0$ to $Y_m$ of the loop coil group 15Y are each connected at one end thereof to the selection circuit 101 and grounded at the other end thereof.

Therefore, in place of providing a phase inversion circuit in the selection circuit 101, for example, a selection circuit may be provided that switches two ends of a loop coil, which serves as a bottom coil, to be connected to the selection circuit 101 and to be grounded, respectively, in a reverse relationship to that of the two ends of a loop coil, which serves as a peak coil. Based on this connection scheme, an advantageous effect can be achieved similar to that achieved where a signal is supplied via a phase inversion circuit to the loop coil which serves as a bottom coil.

Modifications

In the embodiments described above, the loop coils configuring the loop coil group 15X and the loop coils configuring the loop coil group 15Y are each formed by winding an electrode, for example, by one turn, two turns or three turns. Similarly, the loop coils 16A and 16B of the auxiliary sensor 16 are each formed by winding an electrode. The number of turns of the loop coils can be suitably set according to each application. Further, the electrodes used to configure the sensors 13 and 16 are not limited to loop coils. If a signal whose phase is inverted is supplied as in the case of the second embodiment, then the present invention can be applied also where a plurality of single electrodes (single conductors) are used to form the sensor 13 and the auxiliary sensor 16.

In the embodiments described above, it is not necessary to identify a loop coil at which the signal level of the reception signal is lowest as a bottom coil. For example, a loop coil may be selected as a bottom coil, based on the lowest signal level of a reflection signal received from the position indicator 20 by a loop coil (electrode) configuring the sensor 13 and the auxiliary sensor 16.

Although the sensor 13 is disposed in an overlapping relationship on the display screen 12 of an LCD unit, the position at which the sensor 13 is disposed is not limited to this configuration. For example, the sensor 13 may be provided on the lower side of the LCD unit (on the face side opposite from the display screen 12).

In the case of the second embodiment described above, where the loop coil just below the position indicator 20 is the loop coil $X_0$ of the loop coil group 15X for example, a signal of a phase opposite from that of a signal supplied to the loop coil $X_0$ may be supplied not only to the loop coil $X_3$ of the loop coil group 15X, which serves as a bottom coil, but also, for example, to the loop coil 16A or the loop coil 16B of the auxiliary sensor 16. In this case, a phase inversion circuit may be provided in the selection circuit 106 such that one of a signal supplied from the transmission signal generation circuit 110 and a signal obtained by inverting the phase of the signal supplied from the transmission signal generation circuit 110 can be selected so as to be supplied to the loop coil 16A or 16B. As described hereinabove with reference to FIG. 13, if the winding directions of the loop coils 16A and 16B of the auxiliary sensor 16 and the loop coils of the sensor 13 are opposite from each other, then there is no need to provide the phase inversion circuit in the selection circuit 106.

In the embodiments described above, the inputting apparatus formed of the position indicator 20 and the position detection apparatus 10N or 10X determines a peak coil and a bottom coil upon global scan, and signals are transmitted from both of the peak coil and the bottom coil based on the determination. However, the present invention need not determine a bottom coil every time global scan is performed.

For example, upon start of use (for example, when the power is supplied to the inputting apparatus), global scan for determining a peak coil and a bottom coil may be performed as test scan, and a bottom coil may be mechanically determined in accordance with the relationship between the peak coil and the bottom coil determined by the test scan. For example, if it is determined based on the test scan that a peak coil and a bottom coil are positioned in a spaced relationship by a three-coil distance from each other, then a signal may be supplied to a coil spaced by a three-coil distance from a peak coil as a bottom coil.

Others

The functions of the sensor of the detection apparatus are implemented by the sensor 13 of the position detection apparatus 10N. The functions of the signal supplying circuit of the detection apparatus are, in the detection apparatus 10N, implemented by a section including the oscillator 111, current driver 112, transmission-reception switching circuit 102 and selection circuit 101 and are, in the detection apparatus 10X, implemented by a section including the oscillator 111, current driver 112, sensor switching circuit 103, transmission-reception switching circuit 102 and selection circuit 101.

The functions of the detection circuit of the detection apparatus are implemented principally by the reception signal processing circuit 120 and the process controlling unit 130 of the position detection apparatus 10N or by the reception signal processing circuit 120 and the process controlling unit 130A of the position detection apparatus 10X. The functions of the control circuit of the detection apparatus are implemented by the process controlling unit 130 of the position detection apparatus 10N and the process controlling unit 130 of the position detection apparatus 10X.

The functions of the phase inversion circuit of the detection apparatus are implemented by the phase inversion circuits 1X and 1Y provided in the selection circuit 101 of the position detection apparatus 10N and 10X. The functions of the switch circuit of the position detection apparatus are implemented by the switch circuits 2X and 2Y provided in the selection circuit 101 of the position detection apparatus 10N and 10X.

The functions of the first and second signal generation circuits of the detection apparatus are implemented by the phase inversion circuits 1X and 1Y and the switch circuits 2X and 2Y provided in the selection circuit 101 of the position detection apparatus 10N and 10X. The functions of the first sensor of the detection apparatus are implemented by the sensor 13 of the position detection apparatus 10X, and the functions of the second sensor of the detection apparatus are implemented by the auxiliary sensor 16 of the position detection apparatus 10X.

The method described with reference to the flow charts of FIGS. 6, 12 and 13 is a method corresponding to an embodiment of the detection method according to the present disclosure. The apparatus formed of the position indicator 20 and the position detection apparatus 10N is an inputting apparatus applied to the electronic apparatus 10. An apparatus formed of the position indicator 20 and the position detection apparatus 10X is an inputting apparatus applied to the electronic apparatus 10A.

DESCRIPTION OF REFERENCE SYMBOLS

10 . . . Electronic apparatus, 11 . . . Housing, 11A . . . Upper side housing, 11B . . . Lower side housing, 12 . . . Display screen, 13 . . . Sensor, 13A . . . Indication inputting face, 15X . . . Loop coil group, $X_0$ to $X_n$ . . . Loop coil, 15Y . . . Loop coil group, $Y_0$ to $Y_m$ . . . Loop coil, MB . . . Mother board, 10N . . . Position detection apparatus, 101 . . . Selection circuit, 1X(1), 1X(2) . . . Phase inversion circuit, 2X(1), 2X(2) . . . Switch circuit, 1Y(1), 1Y(2) . . . Phase inversion circuit, 2Y(1), 2Y(2) . . . Switch circuit, 102 . . . Transmission-reception switching circuit, 110 . . . Transmission signal generation circuit, 111 . . . Oscillator, 112 . . . Current driver, 120 . . . Reception signal processing circuit, 121 . . . Reception amplifier, 122 . . . Detection circuit, 123 . . . LPF, 124 . . . Sample and hold circuit, 125 . . . A/D conversion circuit, 130 . . . Process controlling unit, 14A, 14B . . . Auxiliary inputting unit, 16 . . . Auxiliary sensor, 16A, 16B . . . Loop coil, 103, 104 . . . Sensor switching circuit, 105 . . . Transmission-reception switching circuit, 106 . . . Selection circuit, 130A . . . Process controlling unit

The invention claimed is:

1. An indicator detection apparatus, which transmits a signal to an indicator having a resonance circuit to cause the resonance circuit to resonate and which receives a signal transmitted from the resonance circuit of the indicator to detect the indicator, the indicator detection apparatus comprising:
    a sensor including a plurality of electrodes which, in operation, transmit the signal to the indicator and receive the signal transmitted from the resonance circuit of the indicator;
    a signal supplying circuit which, in operation, supplies a first signal to the sensor causing each of the plurality of electrodes to generate a magnetic field and to transmit a signal to the indicator causing the resonance circuit of the indicator to resonate;
    a detection circuit which, in operation, detects the signal transmitted from the resonance circuit of the indicator and received by the plurality of electrodes of the sensor,
    wherein, when the first signal is supplied to a first electrode at which the signal transmitted from the resonance circuit of the indicator indicates a highest signal level out of the plurality of electrodes of the sensor which receive the signal transmitted from the resonance circuit of the indicator, the signal supplying circuit supplies, to a second electrode at which the received signal transmitted from the resonance circuit of the indicator has a lowest signal level, a second signal which causes a magnetic field generated by the second electrode to be directed so as to strengthen a magnetic field generated by the first electrode;
    a phase inversion circuit which, in operation, inverts a phase of the first signal to generate the second signal;
    a switch circuit which, in operation, selects the plurality of electrodes including the first electrode and the second electrode; and
    a control circuit which, in operation, controls the switch circuit to cause the first signal to be supplied to the first electrode and cause the second signal to be supplied to the second electrode.

2. The indicator detection apparatus according to claim 1, wherein the plurality of electrodes of the sensor each include a loop coil formed by winding a wire-like conductor.

3. The indicator detection apparatus according to claim 1, wherein:
    the signal supplying circuit includes a first signal generation circuit that generates the first signal to be supplied to the first electrode and a second signal generation circuit that generates the second signal to be supplied to the second electrode, and
    the control circuit, in operation, controls the second signal generation circuit to supply the second signal in response to detection of the indicator by the detection circuit.

4. The indicator detection apparatus according to claim 1, wherein the second electrode is wound in a direction opposite to a winding direction of the first electrode.

5. The indicator detection apparatus according to claim 1, wherein:
the sensor includes first and second sensors positioned adjacent to each other, and
the first electrode is included in a first one of the first and second sensors and the second electrode is included in a second one of the first and second sensors, the first one of the first and second sensors being different from the second one of the first and second sensors.

6. The indicator detection apparatus according to claim 1, wherein, in operation, the control circuit specifies the first electrode and the second electrode based on a signal level of the signal from the indicator detected by the detection circuit.

7. The indicator detection apparatus according to claim 6, further comprising:
a display having a display region,
wherein the sensor is disposed in an overlapping relationship with the display region of the display.

8. An inputting system comprising:
an indicator; and
a detection apparatus;
the indicator including a resonance circuit including a coil and a capacitor, the resonance circuit receiving a signal from the detection apparatus and transmitting a signal in response to the signal received from the detection apparatus;
the detection apparatus including:
a sensor including a plurality of electrodes which, in operation, transmit the signal to the indicator and receive the signal transmitted from the resonance circuit of the indicator,
a signal supplying circuit which, in operation, supplies a first signal to the sensor causing each of the plurality of electrodes to generate a magnetic field and to supply a signal to the indicator, and
a detection circuit which, in operation, detects the signal transmitted from the indicator and received by the plurality of electrodes of the sensor,
wherein, when the first signal is supplied to a first electrode at which the signal transmitted from the resonance circuit of the indicator indicates a highest signal level out of the plurality of electrodes of the sensor which receive the signal transmitted from the resonance circuit of the indicator, the signal supplying circuit supplies, to a second electrode at which the received signal transmitted from the resonance circuit of the indicator has a lowest signal level, a second signal which causes a magnetic field generated by the second electrode to be directed so as to strengthen a magnetic field generated by the first electrode;
a phase inversion circuit which, in operation, inverts a phase of the first signal to generate the second signal;
a switch circuit which, in operation, selects the plurality of electrodes including the first electrode and the second electrode; and
a control circuit which, in operation, controls the switch circuit to cause the first signal to be supplied to the first electrode and cause the second signal to be supplied to the second electrode.

9. A detection method for a detection apparatus which detects an indicator using a sensor, the sensor including a plurality of electrodes for transmitting a signal to the indicator having a resonance circuit to cause the resonance circuit to resonate and receiving a signal transmitted from the resonance circuit of the indicator, the detection method comprising:
supplying a first signal to the plurality of electrodes of the sensor;
when supplying the first signal to a first electrode at which the received signal from the resonance circuit of the indicator indicates a highest signal level from among the plurality of electrodes of the sensor which receive the signal from the resonance circuit of the indicator to generate a magnetic field from the first electrode, supplying, to a second electrode at which the received signal from the resonance circuit of the indicator indicates a lowest signal level, a second signal which causes a magnetic field generated from the second electrode to be directed so as to strengthen the magnetic field generated from the first electrode;
generating the second signal by inverting a phase of the first signal;
selecting, by a switch circuit, the plurality of electrodes including the first electrode and the second electrode; and
controlling the switch circuit to cause the first signal to be supplied to the first electrode and cause the second signal to be supplied to the second electrode.

* * * * *